(12) United States Patent
Shibata et al.

(10) Patent No.: US 6,464,280 B1
(45) Date of Patent: Oct. 15, 2002

(54) INSTRUMENT PANEL

(75) Inventors: Monoru Shibata, Inazawa; Akiyoshi Nagano, Ama-gun; Katuhiro Katagiri, Kakamigahara; Masaru Ido, Gifu; Yuji Kuriyama, Seki; Shigehiro Ueno, Kasugai, all of (JP)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 09/493,808

(22) Filed: Jan. 28, 2000

(30) Foreign Application Priority Data

Mar. 25, 1999 (JP) .......................................... 11-081350

(51) Int. Cl.[7] ............................................. B62D 25/14
(52) U.S. Cl. .................... 296/70; 296/180.9; 280/728.3
(58) Field of Search ................................ 296/70, 180.9; 280/728.3

(56) References Cited

U.S. PATENT DOCUMENTS

| 4,911,471 | A | * | 3/1990 | Hirabayashi | 280/732 |
|---|---|---|---|---|---|
| 5,183,288 | A | * | 2/1993 | Inada et al. | 280/732 |
| 5,230,530 | A | * | 7/1993 | Iriyama et al. | 280/732 |
| 5,234,227 | A | * | 8/1993 | Webber | 280/732 |
| 5,242,192 | A | * | 9/1993 | Prescaro et al. | 280/732 |
| 5,342,085 | A | * | 8/1994 | Hirashima et al. | 280/732 |
| 5,364,124 | A | * | 11/1994 | Donegan et al. | 280/732 |
| 5,378,012 | A | * | 1/1995 | Seiki et al. | 280/732 |
| 5,393,090 | A | * | 2/1995 | Shepherd et al. | 280/732 |
| 5,398,959 | A | * | 3/1995 | Avila | 280/732 |
| 5,398,968 | A | * | 3/1995 | Emambakhsh et al. | 280/732 |
| 5,429,385 | A | * | 7/1995 | Kamiji et al. | 280/732 |
| 5,435,593 | A | * | 7/1995 | Hiramitsu et al. | 280/731 |
| 5,439,246 | A | * | 8/1995 | Ravenberg et al. | 280/732 |
| 5,478,107 | A | * | 12/1995 | Yamagishi et al. | 280/732 |
| 5,531,471 | A | * | 7/1996 | Terai et al. | 280/732 |
| 5,588,668 | A | * | 12/1996 | Emambakhsh et al. | 280/732 |
| 5,639,116 | A | * | 6/1997 | Shimizu et al. | 280/732 |
| 5,641,178 | A | * | 6/1997 | Lee | 280/732 |
| 5,641,554 | A | * | 6/1997 | Koizumi et al. | 280/728.3 |
| 5,662,350 | A | * | 9/1997 | Bathon et al. | 280/728.2 |
| 5,673,931 | A | * | 10/1997 | Gray et al. | 280/728.3 |
| 5,762,395 | A | | 6/1998 | Merrifield et al. | |
| 5,865,461 | A | * | 2/1999 | Totani et al. | 280/728.3 |
| 6,073,987 | A | * | 6/2000 | Lindberg et al | 296/70 |
| 6,109,645 | A | * | 8/2000 | Totani et al. | 280/728.3 |
| 6,113,131 | A | * | 9/2000 | Uehara et al. | 280/728.3 |
| 6,193,271 | B1 | * | 2/2001 | Shimane | 280/728.3 |
| 6,273,495 | B1 | * | 8/2001 | Haba et al. | 296/70 |

FOREIGN PATENT DOCUMENTS

| JP | 9-240316 | 9/1997 |
|---|---|---|
| JP | 10-071874 | 3/1998 |

* cited by examiner

Primary Examiner—Kiran B. Patel
(74) Attorney, Agent, or Firm—Pillsbury Winthrop LLP

(57) ABSTRACT

An instrument panel is provided with an upper panel of a synthetic resin disposed on the front side, and a core panel of a synthetic resin retentive of shape and connected to the rear side of the upper panel. The core panel has a casing portion which has an opening portion opened in an air bag-protruding direction and which receives a folded air bag of a passenger seat air bag unit and an inflator for supplying an inflating gas to the air bag. The upper panel has door portions which cover the casing portion and which are pressed and opened by the air bag when the air bag is inflated.

24 Claims, 15 Drawing Sheets

INSTRUMENT PANEL

BACKGROUND OF THE INVENTION

1. Field of the Invention

The present invention relates to an instrument panel of a synthetic resin for a car.

The present application is based on Japanese Patent Application No. Hei. 11-81350.

2. Description of the Related Art

Heretofore, a passenger seat air bag unit to be installed in an instrument panel in front of a passenger seat was constituted by a folded air bag, an inflator for supplying an inflating gas to the air bag, and a casing in which the air bag and the inflator were received. Further, a door portion was disposed in the instrument panel so as to be ruptured and opened when the air bag was inflated (see Japanese Patent Publication No. Hei. 9-156400, and so on).

The casing, however, required strength because the casing had a function of receiving both the air bag and the inflator and a function of guiding the inflating gas of the inflator to the air bag and guiding the deployment of the air bag when the air bag was inflated. In the background art, the casing was made from a sheet metal. Hence, the passenger seat air bag unit was heavy in weight.

Further, in the background art, each junction box (hereinafter merely abbreviated as "box") in which wire harness extending from a meter, or the like, disposed in the instrument panel was connected was inserted vertically into between a portion of a body on a lateral lower side of the instrument panel and the instrument panel and screwed down horizontally to the body so as to be attached and fixed to the instrument panel.

The work of attaching the box was, however, difficult because the instrument panel disturbed it. Further, the direction of screwing down the box was horizontal. Attachment holes provided in both the box and the body for screwing down the box to the body were positioned vertically in the direction of insertion of the box. Hence, the positioning was difficult because the attachment holes of the body were hidden behind the box. The work of attaching the box was made more difficult.

Still further, in the background art, each register to be disposed in the instrument panel was screwed down from the back side of the instrument panel. Hence, there was still room for improvement in efficiency in the attaching work.

Still further, instrument panels of the type constituted by an upper panel disposed on the front side and a core panel disposed on the rear side of the upper panel were known in the background art (see Japanese Utility Model Publication No. Sho. 56-4928, Japanese Patent Publication No. Hei. 1-190551, Japanese Patent Publication No. Hei. 5-77659, and so on).

Further, in those instrument panels, circumferential walls of air-conditioner ducts were formed from the upper panel and the core panel.

In the background art, however, a sealing material provided separately was assembled with regions of formation of the ducts so that the regions were kept airtight when the upper panel and the core panel were connected to each other. Hence, the number of constituent parts of the instrument panel was increased and the work of assembling the upper panel with the core panel took a great deal of labor.

SUMMARY OF THE INVENTION

A first object of the present invention is to provide an instrument panel in which a passenger seat air bag unit is lightened in weight to thereby solve the aforementioned problem.

A second object of the present invention is to provide an instrument panel in which the work of attaching a box is simplified to thereby solve the aforementioned problem.

A third object of the present invention is to provide an instrument panel in which the work of attaching registers is simplified to thereby solve the aforementioned problem.

A fourth object of the present invention is to provide an instrument panel in which regions of air-conditioner ducts can be kept airtight easily while the number of constituent parts is suppressed from increasing to thereby solve the aforementioned problem.

According to a first aspect of the present invention, there is provided an instrument panel comprising an upper panel of a synthetic resin disposed on the front side, and a core panel of a synthetic resin connected to the rear side of the upper panel and having a shape retentive property; the core panel including a casing portion having an opening portion opened in an air bag-protruding direction, the casing portion receiving a folded air bag of an air bag unit for a passenger seat and an inflator for supplying an inflating gas to the air bag; the upper panel including door portions which cover the casing portion so that the door portions are pressed and opened by the air bag when the air bag is inflated.

According to a second aspect of the present invention, there is provided an instrument panel comprising an upper panel of a synthetic resin disposed on the front side, and a core panel of a synthetic resin disposed on the rear side of the upper panel and having a shape retentive property; the upper panel and the core panel being provided with connection portions which can be connected to each other; the core panel including fixation cavity portions each having an opening portion opened upward for attachment, the fixation cavity portions being provided so that junction boxes are inserted in the fixation cavity portions and attached and fixed to the fixation cavity portions respectively.

According to a third aspect of the present invention, there is provided an instrument panel comprising an upper panel of a synthetic resin disposed on the front side, and a core panel of a synthetic resin disposed on the rear side of the upper panel and having a shape retentive property; the upper panel and the core panel being provided with connection portions which can be connected to each other; the upper panel including a cover portion which constitutes an upper wall in circumferential walls of air-conditioner ducts communicating with registers; the core panel including a circumferential wall portion which constitutes walls other than the upper wall in the circumferential walls of the ducts; the core panel further including receiving cavity portions in regions of arrangement of the registers, the receiving cavity portions having opening portions opened upward for receiving the registers respectively so that the registers are inserted and received in the receiving cavity portions respectively; the upper panel further including holding portions in regions of arrangement of the registers, the holding portions being capable of sandwiching and holding the registers between the upper panel and the core panel when the upper panel and the core panel are connected to each other.

According to a fourth aspect of the present invention, there is provided an instrument panel comprising an upper panel of a synthetic resin disposed on the front side, and a core panel of a synthetic resin disposed on the rear side of the upper panel and having a shape retentive property; the upper panel and the core panel being provided with connection portions which can be connected to each other; the upper panel including a cover portion which constitutes an upper wall in circumferential walls of air-conditioner ducts;

the core panel including a circumferential wall portion which constitutes walls other than the upper wall in the circumferential walls of the ducts; flexible thin lip portions are formed at upper ends of the circumferential wall portion or lower ends of the cover portion integrally with the core panel or the upper panel so that the lip portions come into pressure contact with the cover portion of the upper panel or the circumferential wall portion of the core panel to keep airtightness when the upper panel and the core panel are connected to each other.

In the instrument panel according to the first aspect of the present invention, the core panel has a casing portion which has an opening portion opened in an air bag-protruding direction and which receives a folded air bag of a passenger seat air bag unit and an inflator for supplying an inflating gas to the air bag. A casing for the passenger seat air bag unit is formed in the synthetic resin instrument panel itself. Hence, the background-art heavy sheet-metal casing can be eliminated, so that the passenger seat air bag unit can be lightened in weight.

Further, in the background art, after the air bag and the inflator were installed in a casing, the casing had to be attached and fixed to a car while being positioned with respect to the instrument panel attached to the car in advance. In the background art, it was necessary that the air bag unit was attached to the car while the casing was positioned with respect to both the instrument panel and the frame side of the car. Hence, the work of attaching the assistant driver s air bag unit to the car took a great deal of labor. In the present invention, however, if the air bag, etc. are installed in the instrument panel in advance, the passenger seat air bag unit can be attached to the car by a simple means of attaching the instrument panel itself to the car after that. Hence, the work of attaching the passenger seat air bag unit to the car can be simplified.

Hence, in the instrument panel according to the first aspect of the present invention, reduction in weight of the passenger seat air bag unit can be attained and the work of attaching the passenger seat air bag unit to the car can be simplified.

In the instrument panel according to the second aspect of the present invention, the core panel has fixation cavity portions which have opening portions opened upward for attachment and to which boxes are inserted, attached and fixed respectively.

That is, boxes are not attached to the body as in the background art but attached to the core panel itself. With respect to the direction of attachment, the boxes are inserted in the fixation cavity portions through the opening portions opened upward respectively. Then, the upper panel is connected to an upper portion of the core panel by use of the connection portions. In this configuration, the work of attaching the boxes can be performed under sufficient eye observation. Hence, the boxes can be attached and fixed easily.

Hence, in the instrument panel according to the second aspect of the present invention, the work of attaching the boxes can be simplified.

In the instrument panel according to the third aspect of the present invention, the core panel has receiving cavity portions which are provided in regions of arrangement of registers, which have opening portions opened upward for receiving the registers and in which the registers are inserted and received whereas the upper panel has holding portions which are provided in regions of arrangement of the registers and which can hold the registers so as to cooperate with the core panel when the upper panel and the core panel are connected to each other.

That is, the registers are attached to the instrument panel as follows. The registers are inserted in the receiving cavity portions through the opening portions respectively in the core panel. When the upper panel is then connected to the core panel by use of the connection portions, the registers are held in the receiving cavity portions by the holding portions of the upper panel respectively.

Therefore, in the instrument panel according to the third aspect of the present invention, the registers are merely received in the receiving cavity portions of the core panel without use of any screw means. After that, the registers can be attached to the instrument panel easily by a simple means of assembling the instrument panel itself. Hence, the work of attaching the registers is simplified.

It is a matter of course that air for air-conditioning can be fed to the registers smoothly because the air-conditioner ducts each constituted by the cover portion of the upper panel and the circumferential wall portion of the core panel communicate with the registers after the upper panel and the core panel are connected to each other.

Hence, in the instrument panel according to the third aspect of the present invention, the registers can be attached to the instrument panel easily by a simple means of disposing the registers in predetermined positions respectively in the middle of assembling of the instrument panel in which the upper panel and the core panel are connected to each other.

In the instrument panel according to the fourth aspect of the present invention, the upper panel has a cover portion which constitutes an upper wall in circumferential walls of the air-conditioner ducts whereas the core panel has a circumferential wall portion which constitutes walls other than the upper wall in the circumferential walls of the ducts. Further, flexible thin lip portions are formed at upper ends of the circumferential wall portion or lower ends of the cover portion integrally with the core panel or the upper panel in order to keep airtightness obtained by pressure contact of the lip portions with the cover portion of the upper panel or the circumferential wall portion of the core panel when the upper panel and the core panel are connected to each other.

Therefore, when the upper panel and the core panel are connected to each other, the lip portions formed in the circumferential wall portion of the core panel or the cover portion of the upper panel come into pressure contact with the cover portion of the upper panel or the circumferential wall portion of the core panel so that the air-conditioner ducts can be kept airtight. Further, the lip portions are formed integrally with the circumferential wall portion of the core panel or the cover portion of the upper panel. Special members provided separately need not to be attached as the lip portions.

Hence, in the instrument panel according to the fourth aspect of the present invention, regions of formation of the air-conditioner ducts can be kept airtight easily while increase in the number of constituent parts is suppressed.

Features and advantages of the invention will be evident from the following detailed description of the preferred embodiments described in conjunction with the attached drawings.

DETAILED DESCRIPTION OF THE PREFERRED EMBODIMENTS

An embodiment of the present invention will be described below with reference to the drawings.

Figure 1:
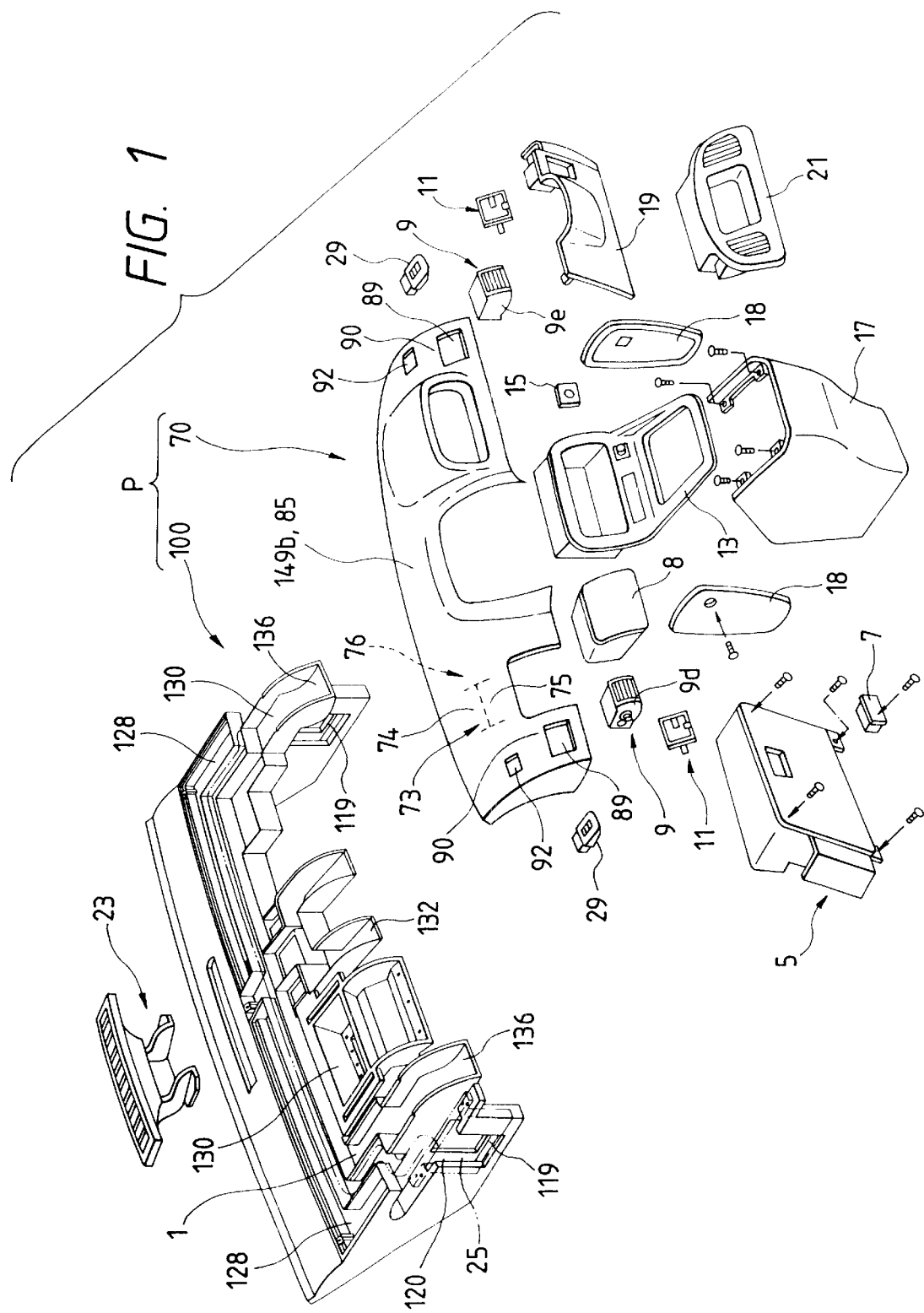
FIG. 1 is a schematic perspective view of an instrument panel and parts installed in the instrument panel in an embodiment of the present invention.

As shown in FIG. 1, an instrument panel P in this embodiment is constituted by an upper panel 70 of a synthetic resin disposed on the front side, and a core panel 100 of a synthetic resin disposed on the rear side of the upper panel 70 and retentive of shape. A grab box 5, a grab box-locking mechanism 7, an upper box 8, registers 9, a shift bezel 13, a cigarette lighter protector 15, a front console 17, carpet covers 18, an undercover 19, a cluster panel 21, boxes (junction boxes) 25, side defroster nozzles 29, a meter 31 (see FIG. 9), a passenger seat air bag unit M (see FIG. 2), and so on, are installed in a region of the instrument panel P.

As shown in FIGS. 3 to 5 and FIGS. 9, 10 and 13, in this embodiment, the upper panel 70 except a region constituting a cover portion 73 of the passenger seat air bag unit M which will be described later is constituted by a base 70a of filler-containing polypropylene disposed on the rear side, and a decorative sheet 70c disposed on the front side of the base 70a. The decorative sheet 70c is constituted by a foam layer 70d of foamed polypropylene, or the like, disposed on the base 70a side, and a skin layer 70e of soft vinyl chloride, olefin or styrene thermoplastic elastomer, or the like, disposed on the front side. Incidentally, the decorative sheet 70c further has a thin barrier layer which is not shown but provided in the foam layer 70d on the base side. The thin barrier layer is formed from olefin or styrene thermoplastic elastomer which is well compatible with bases 70a and 70b.

A portion of the upper panel 70 near the cover portion 73 is constituted by a base 70b of olefin thermoplastic elastomer, and a decorative sheet 70c disposed on the front side of the base 70b so that the cover portion 73 is expanded easily. The decorative sheet 70c disposed on the front side of the base 70b is provided by extending the decorative sheet 70c disposed on the front side of the base 70a to the front side of the base 70b.

The upper panel 70 is produced by the steps of: shaping the decorative sheet 70c into a predetermined shape by vacuum formation; and injection-molding the bases 70a and 70b in the condition that the shaped decorative sheet 70c is set in molds for the bases 70a and 70b.

On the other hand, the core panel 100 in this embodiment is injection-molded from a hard synthetic resin retentive of shape such as filler-containing polypropylene, polyamide, or the like.

Figure 5:
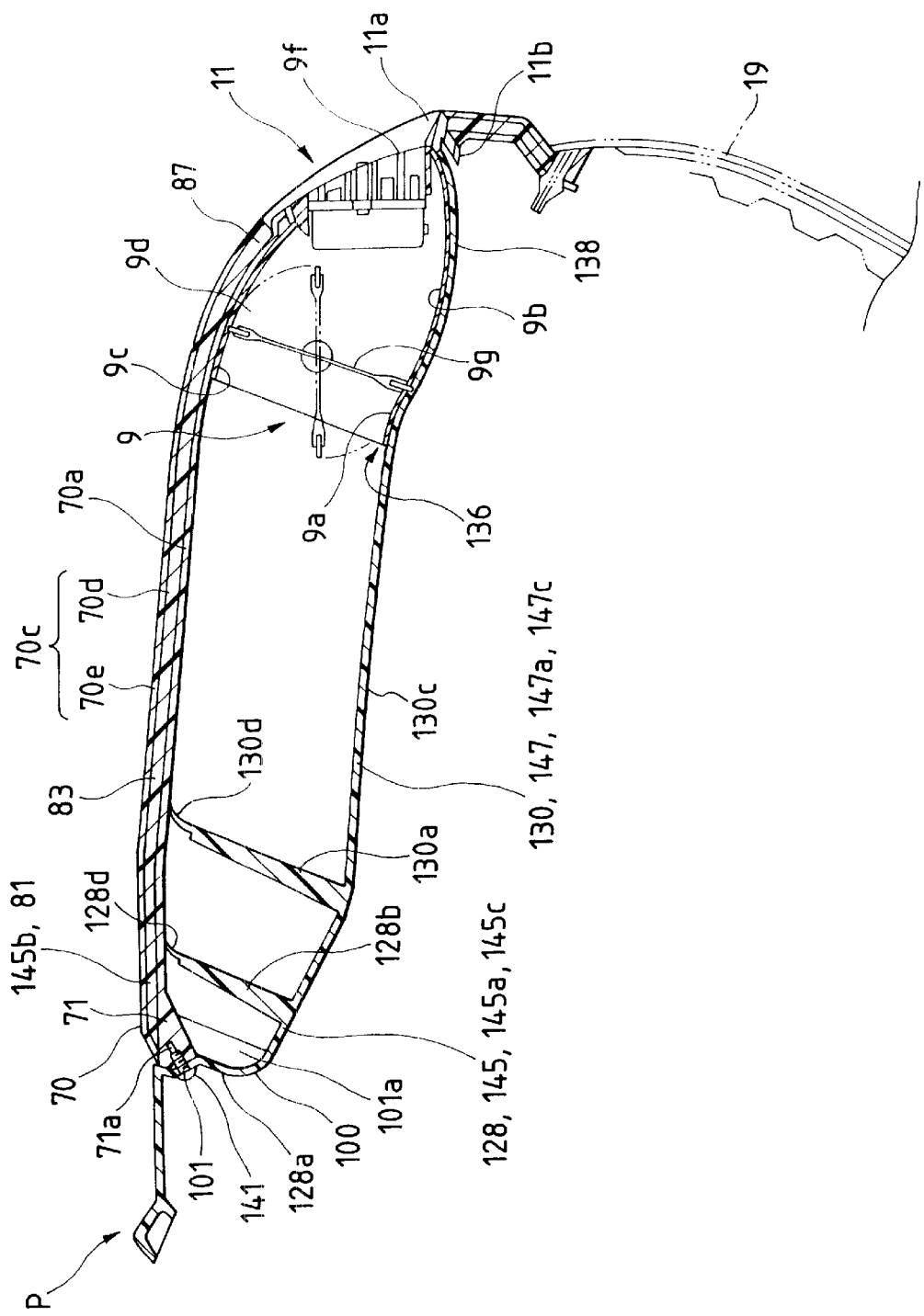
FIG. 5 is a vertical sectional view of a region of arrangement of a right-side register in this embodiment.
Figure 7:
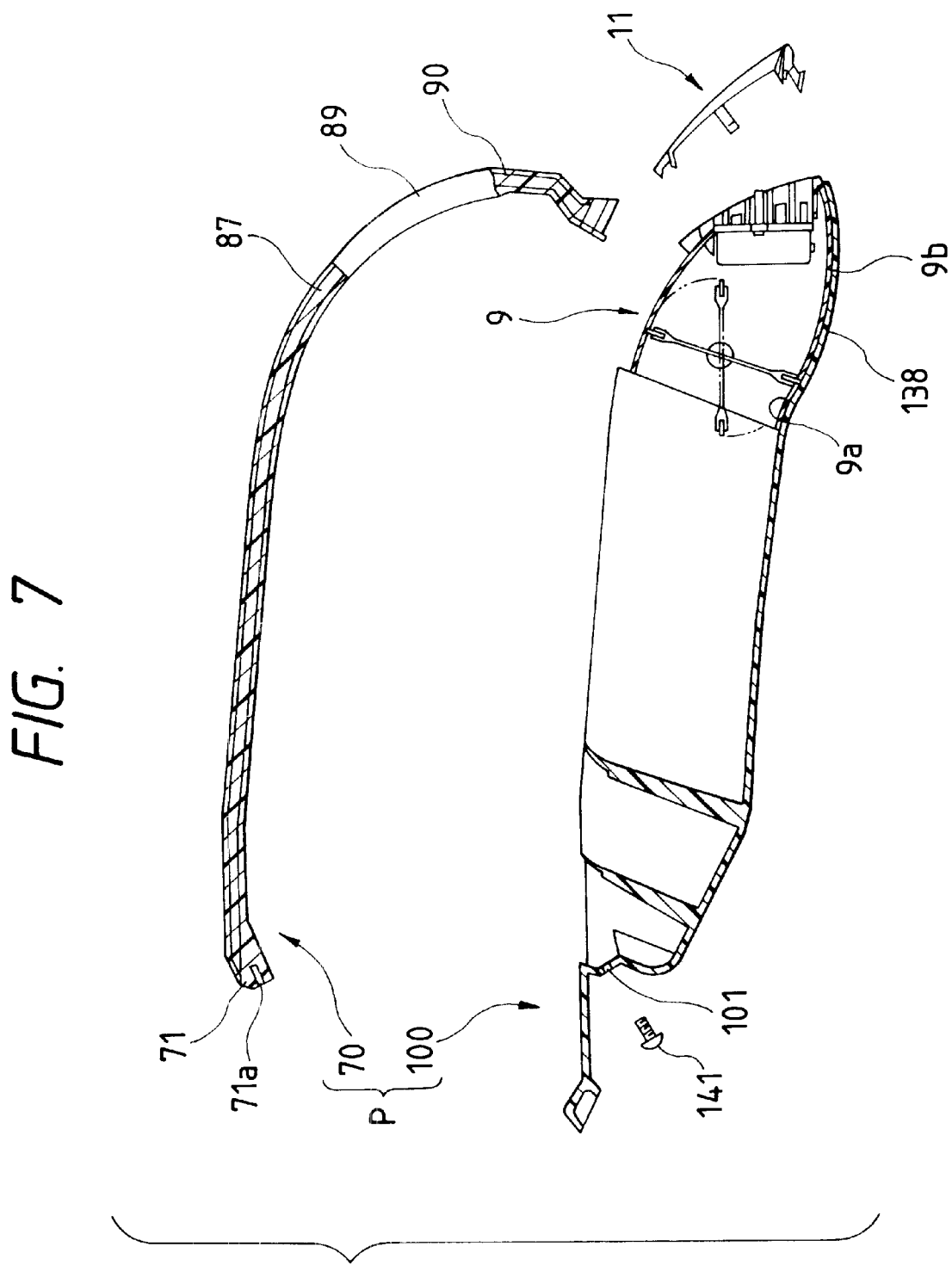
FIG. 7 is a vertical sectional view for explaining a state of installation of the register in this embodiment.

As shown in FIGS. 5 and 7, connection portions 71 and 101 for connecting the upper panel 70 and the core panel 100 to each other by screws 141 are provided in a plurality of predetermined positions of the upper panel 70 and the core panel 100. The connection portions of the upper panel 70 are disposed as connection boss portions 71 provided with attachment holes 71a which are thread-engaged with the screws 141. The connection portions of the core panel 100 have insertion holes 101 in which the screws 141 are inserted. Ribs 101a for supporting the connection portions 71 are formed around the insertion holes 101 to prevent the upper panel 70 from sinking after connection so that the instrument panel looks nice.

Figure 4:
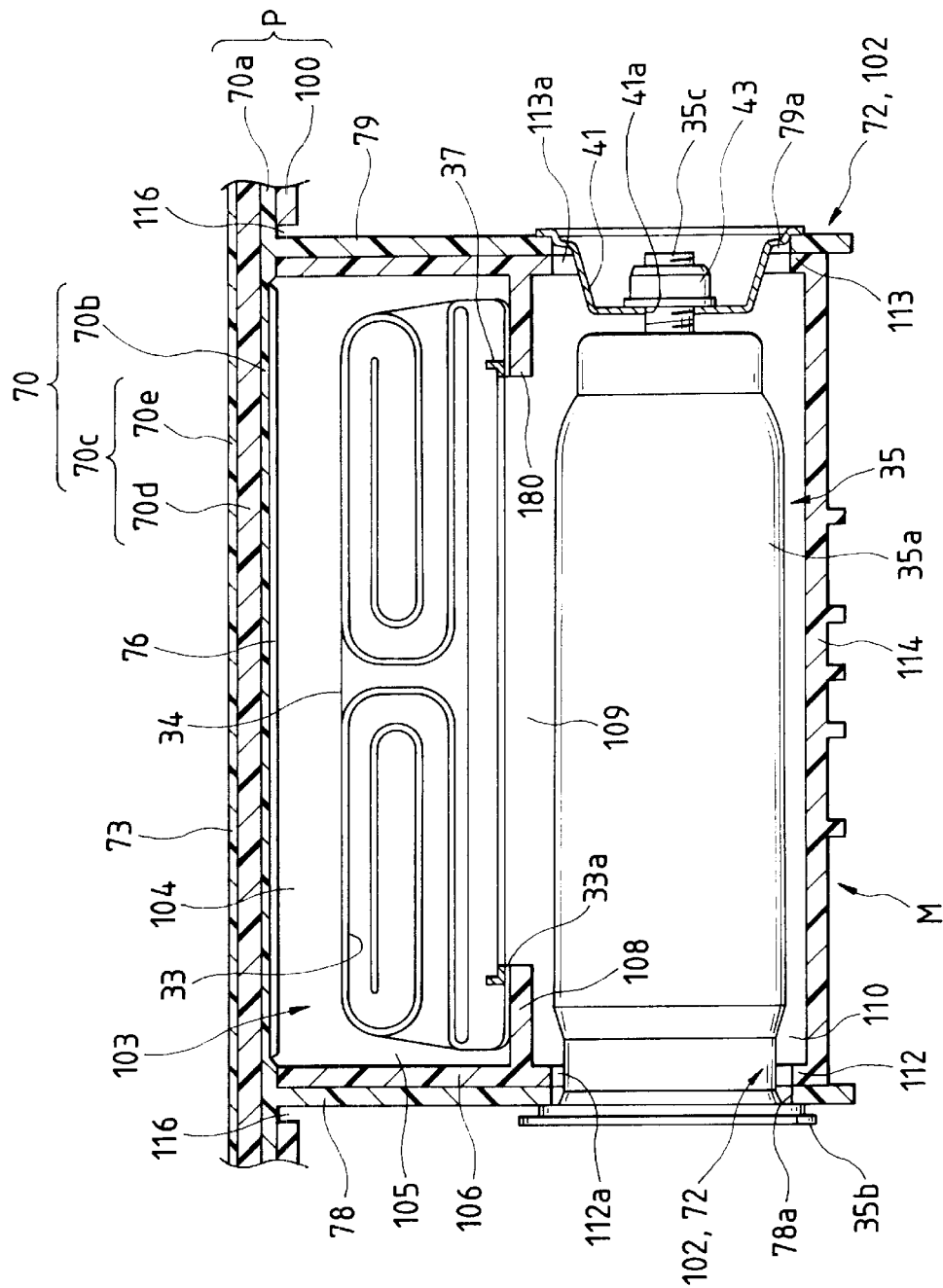
FIG. 4 is an enlarged vertical sectional view, corresponding to the IV—IV region in FIG. 3, showing a state in which the passenger seat air bag unit is installed in the instrument panel in this embodiment.

In this embodiment, as shown in FIG. 4, the connection portions 72 and 102 for connecting the upper panel 70 and the core panel 100 to each other are disposed in a region of arrangement of a passenger seat air bag unit M by use of an inflator 35 of the air bag unit M. The connection portions 72 of the upper panel 70 are constituted by two side plates 78 and 79 which will be described later. The connection portions 102 of the core panel 100 are constituted by two side walls 112 and 113 of a casing portion 103 which will be described later.

As shown in FIGS. 1 to 4, the cover portion 73 provided in the upper panel 70 is provided with two door portions 74 and 75 so that the door portions 74 and 75 can be pressed and opened by the air bag 33 of the passenger seat air bag unit M when the air bag 33 is inflated. A thin rupture presumptive portion 76 substantially H-shaped viewed from above is disposed around the door portions 74 and 75 so that the door portions 74 and 75 can be opened to the front and rear sides respectively when the air bag 33 is inflated. The reference numerals 74a and 75a designate hinge portions on which the door portions 74 and 75 are opened respectively. There is no rupture presumptive portion 76 formed in the hinge portions 74a and 75a.

Further, in the region of the upper panel 70 in which the cover portion 73 is provided, the two side plates 78 and 79 extending downward so as to be opposite to each other are formed in the vicinity of left and right sides of the door portions 74 and 75. The side plates 78 and 79 are disposed on the outer surfaces of the left and right side walls 112 and 113, respectively, of the casing portion 103. Insertion holes 78a and 79a opened circularly are formed in the side plates 78 and 79 respectively so that the inflator 35 of the passenger seat air bag unit M is inserted in the insertion holes 78a and 79a.

The passenger seat air bag unit M is constituted by an air bag 33 provided with an opening portion 33a, and an inflator 35 for supplying an inflating gas to the air bag 33. Insertion holes 33b are formed in the circumferential edge of the opening portion 33a of the air bag 33 so that bolts 37a of a retainer 37 which will be described later are inserted in the insertion holes 33b. The inflator 35 is constituted by a columnar body 35a provided with a gas discharge port not shown, a flange portion 35b provided at one end of the body 35a, and a male screw portion 35c provided at the other end of the body 35a. In this embodiment, the air bag unit M further has a sheet-metal retainer 37 shaped like a quadrilateral ring for attaching the air bag 33 to the casing portion 103 which will be described later, and a sheet-metal spacer 41 shaped like a dish for attaching the inflator 35 to the casing portion 103. The retainer 37 is provided with bolts 37a which are formed to be inserted in the insertion holes 33b in the circumferential edge of the air bag opening portion 33a and insertion holes 107a of a step portion 107 of the casing portion 103 which will be described later. An insertion hole 41a is formed in the center of the spacer 41 so that the male screw portion 35c of the inflator 35 can be inserted in the insertion hole 41a. Incidentally, the reference numeral 34 designates a rupturable receiving bag for preventing the folded air bag 33 from tumbling down.

Further, in the region of the core panel 100 in which the passenger seat air bag unit M is disposed, as shown in FIGS. 1 to 4 and FIG. 12, the casing portion 103 having an opening portion 104 opened upward rectangularly in an air bag-deploying direction is disposed so as to receive the folded air bag 33 and the inflator 35 in the air bag unit M. The casing portion 103 has an upper chamber 105 for receiving the folded air bag 33 and a lower chamber 110 for receiving the inflator 35.

The upper chamber 105 is constituted by a circumferential wall 106 disposed in the front, rear, left and right of the casing portion 103, step walls 107, 107 disposed in the front and rear of the casing portion 103, and flange portions 108, 108 disposed in the left and right of the casing portion 103. A communicating hole 109 is formed on the inner circumferential side of the step walls 107, 107 and the flange portions 108, 108 so as to lead an inflating gas from the inflator 35 to the upper chamber 105. Further, a plurality of insertion holes 107a are formed in the step walls 107 so that the bolts 37a of the retainer 37 can be inserted in the insertion holes 107a respectively.

The lower chamber 110 is constituted by a semicylindrical bottom wall 114, and a circumferential wall 111 which extends upward from the front, rear, left and right circumferential edges of the bottom wall 114 so as to be connected to inner end portions of the step portions 107, 107 and outer end portions of the flange portions 108, 108. Insertion holes 112a and 113a which are opened circularly so that the inflator 35 is inserted in the insertion holes 112a and 113a are formed in side walls 112 and 113 disposed in the left and right positions of the circumferential wall 111 respectively.

Further, the side walls 78 and 79 of the upper panel 70 are disposed on outer surfaces of the side walls 112 and 113 respectively so that the insertion holes 78a and 79a correspond to the insertion holes 112a and 113a respectively.

Incidentally, the insertion holes 78a and 112a are formed to have the same shape with an inner diameter size permitting the insertion of the body 35a of the inflator 35 but prohibiting the insertion of the flange portion 35b of the inflator 35. Further, the insertion holes 79a and 113a are formed to have the same shape with an inner diameter size smaller than the outer diameter size of the spacer 41.

Further, an attachment bracket portion 115 to be supported to a reinforcer 3 of a car is provided on the rear side of the circumferential wall 111 of the lower chamber 110 so as to protrude downward. The attachment bracket portion 115 is provided with an attachment hole 115a through which a bolt 49 is passed so that the attachment bracket portion 115 is fastened by the bolt 49 to a support bracket 47 which extends from the reinforcer 3. Incidentally, the reference numeral 45 designates a sheet-metal stiffening plate which is sectionally U-shaped and disposed in the circumferential edge of the attachment hole 115a.

Figure 12:
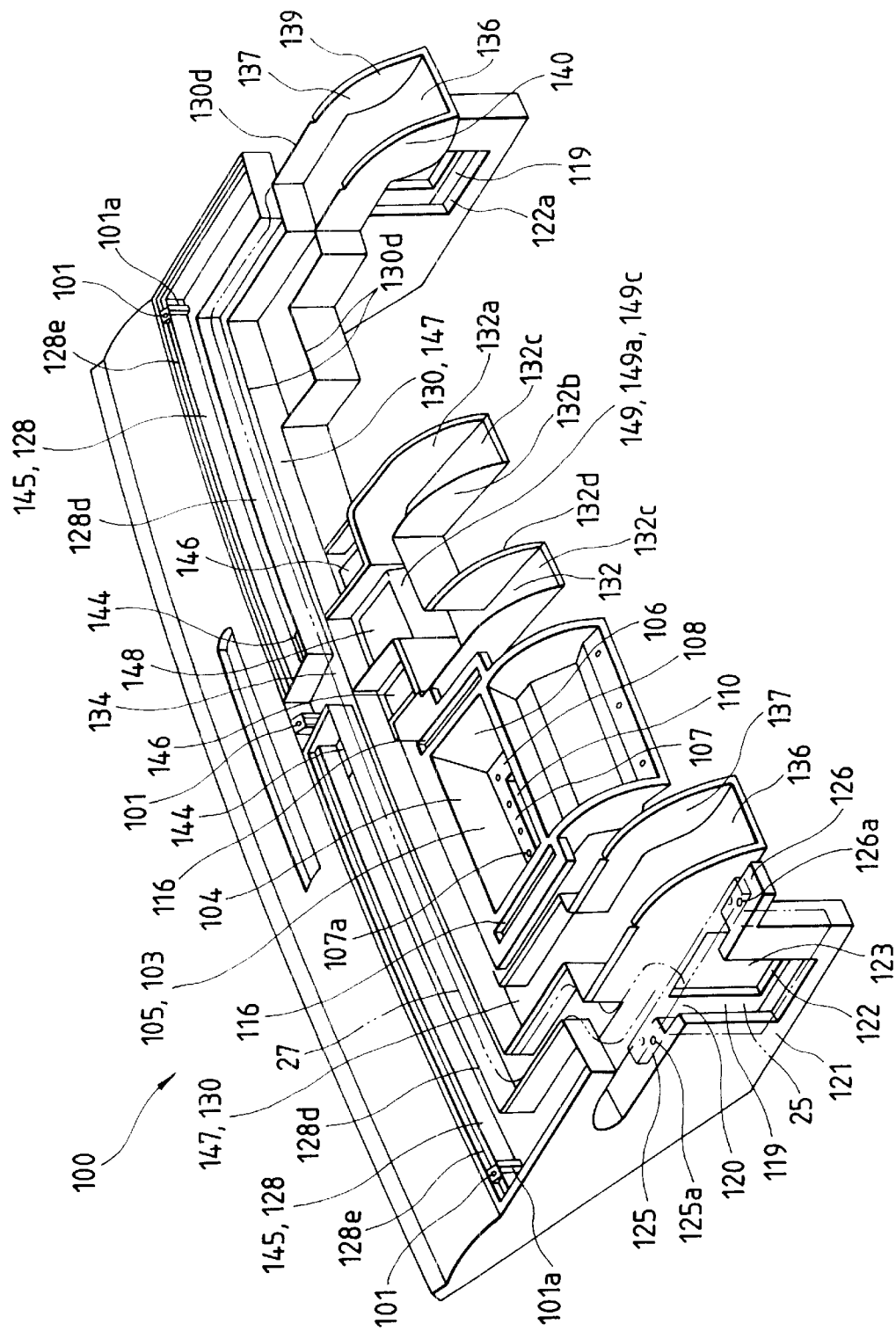
FIG. 12 is a schematic perspective view of a core panel in this embodiment.

Further, as shown in FIGS. 4 and 12, insertion holes 116 are formed in outer regions of the side walls 112 and 113 of the core panel 100 so that the side walls 78 and 79 of the upper panel 70 are inserted in the insertion holes 116 respectively.

Installation of the air bag unit M into the instrument panel P is as follows. The retainer 37 is put into the air bag 33 in advance. The air bag 33 is folded in the condition that the bolts 37a are made to protrude from the insertion holes 33b in the circumferential edge of the opening portion 33a. Further, the air bag 33 is covered with a receiving bag 34 in the condition that the bolt 37a side is exposed.

Further, the folded air bag 33 is received in the upper chamber 105 in the casing portion 103 of the core panel 100 through the opening portion 104. The bolts 37a of the retainer 37 are inserted in the insertion holes 107a of the step portions 107 in the casing portion 103 and the nuts 39 are thread-engaged with the bolts 37a respectively. In this manner, the air bag 33 can be installed in the casing portion 103.

Then, predetermined parts such as the registers 9, the boxes 25, etc. are installed in the core panel 100. Then, the side plates 78 and 79 are disposed on the outer surfaces of the side walls 112 and 113 of the casing portion 103 through the insertion holes 116 respectively. The upper panel 70 is disposed on the core panel 100 while the attachment holes 71a of the connection boss portions 71 are aligned with the insertion holes 101 respectively. The screws 141 are thread-engaged with the attachment holes 71a through the insertion holes 101 respectively. Thus, the core panel 100 and the upper panel 70 are connected to each other by use of the connection portions 71 and 101. Incidentally, the side defroster nozzles 29 are installed in vents 92 respectively in the upper panel 70 in advance. Alternatively, parts to be installed in the core panel 100 such as the registers 9, the boxes 25, etc. may be installed in the core panel 100 in advance before the installation of the air bag 33.

Then, the male screw portion 35c of the inflator 35 is inserted in the insertion holes 78a and 112a of the casing portion 103 and disposed on the insertion holes 79a and 113a side so that the flange portion 35b is made to abut on the circumferential edge of the insertion hole 78a. Then, in the condition that the outer circumferential edge of the spacer 41 is made to abut on the circumferential edge of the insertion hole 79a while the male screw portion 35c is made to protrude from the insertion hole 41a, a nut 43 is thread-engaged with the male screw portion 35c so that the side plates 78 and 79 and the side walls 112 and 113 are held between the spacer 41 and the flange portion 35b. In this manner, the inflator 35 can be installed in the casing portion 103.

Incidentally, on this occasion, the connection portions 72 of the upper panel 70 which are constituted by the side plates 78 and 79 are connected to the connection portions 102 of the core panel 100 which are constituted by the side walls 112 and 113.

After the core panel 100 and the upper panel 70 are connected to each other, register bezels 11 are fitted around the registers 9 respectively.

Then, a defroster nozzle 23 is disposed in a predetermined position of a body panel 1. A plurality of locking legs 117 (see FIG. 2) provided in the core panel 100 are locked in locking holes 2 provided in the body panel 1, or the like, in the car. An attachment boss portion not shown but provided in the core panel 100 is screwed down to the body panel in another region. Further, the stiffening plate 45 is fitted to the lower end region of the attachment bracket portion 115. In the condition that the bolt 49 is inserted in the attachment hole 115a through the support bracket 47 and the stiffening plate 45, a nut 51 is tightened to the bolt 49. In this manner, the instrument panel P can be attached and fixed to the car.

Then, the grab box 5, the locking mechanism 7, the upper box 8, the cigarette lighter protector 15, the front console 17, the carpet covers 18, the undercover 19, the meter 31, the cluster panel 21, and so on, are installed in predetermined positions of the instrument panel P. Thus, the attachment of the instrument panel P to the car is completed. Incidentally, predetermined devices such as the meter 31, etc. are assembled by connecting wire harness 27 extending from the boxes 25 to the predetermined devices.

If an inflating gas is discharged from the inflator 35 after the attachment of the instrument panel P to the car is completed, the inflating gas flows into the air bag 33. As a result, the air bag 33 presses the door portions 74 and 75 and ruptures the rupture presumptive portion 76. As a result, the door portions 74 and 75 are opened on the hinge portions 74a and 75a as rotation centers respectively, so that the air bag 33 protrudes largely upward from the opening portion 104.

In the instrument panel P in this embodiment, the core panel 100 is provided with the casing portion 103 which has the opening portion 104 opened in an air bag-protruding direction for receiving the folded air bag 33 of the passenger seat air bag unit M and the inflator 35 for supplying an inflating gas to the air bag 33. A casing for the air bag unit M is formed in the synthetic resin instrument panel P itself. Hence, the background-art sheet-metal casing which is heavy in weight can be eliminated, so that the passenger seat air bag unit M can be lightened in weight.

Further, in the background art, a casing was attached and fixed to a car while being positioned with respect to the instrument panel attached to the car in advance after an air bag and an inflator were installed in the casing. Hence, in the background art, the air bag unit had to be attached to the car while the casing was positioned with respect to both the instrument panel and the frame side of the car. As a result, in the background art, the work of attaching the passenger seat air bag unit M to the car took a large deal of labor. In this embodiment, however, the passenger seat air bag unit M can be attached to the car by a simple means of attaching the instrument panel P itself to the car if the air bag 33, the inflator 35, etc. are installed in the instrument panel P in advance. Hence, in this embodiment, the work of attaching the passenger seat air bag unit M to the car can be simplified.

Hence, in the instrument panel P in this embodiment, the passenger seat air bag unit M can be lightened in weight and the work of attaching the passenger seat air bag unit M to the car can be simplified.

Further, in this embodiment, positioning of the door portions 74 and 75 of the upper panel 70 with respect to the casing portion 103 of the core panel 100 can be performed securely because the connection portions 72 and 102 for connecting the upper panel 70 and the core panel 100 to each other are provided in a region of arrangement of the passenger seat air bag unit M. Particularly, in this embodiment, the panels 70 and 100 can be connected to each other while increase in the number of parts is suppressed because the connection portions 72 and 102 are connected to each other by use of the inflator 35 attached to the casing portion 103. Furthermore, the connection portions 72 of the upper panel 70 are constituted by the two side plates 78 and 79 covering the casing portion 103 of the core panel 100 respectively. Hence, the casing portion 103 can be reinforced if the two side plates 78 and 79 are connected to the side walls 112 and 113 respectively.

Although the embodiment has shown the case where two door portions 74 and 75 are provided in the upper panel 70, the present invention may be applied also to the case where one door portion is provided.

Although the embodiment has also shown the case where the casing portion 103 of the core panel 100 is made from a synthetic resin material singly, the present invention maybe applied also to the case where a sheet metal provided as an insert is buried in the casing portion 103 at the time of molding or attached into the casing portion 103 after molding in order to keep the stiffness of the casing portion 103 higher. Incidentally, even in the configuration shown in the latter case, reduction in weight of the air bag unit M is not disturbed because a thinner sheet metal than the sheet metal used in the background-art casing can be used in the present invention.

Although the embodiment has further shown the case where the screws 141 are used for connecting the upper panel 70 and the core panel 100 to each other, the present invention may be applied also to the case where vibration welding/bonding, high-frequency welding/bonding, ultrasonic welding/bonding, direct-heat welding/bonding, or the like, is used for connecting the two panels 70 and 100 to each other.

Although the embodiment has further shown the case where the opening portion 104 of the casing portion 103 is opened upward, the present invention may be applied also to the case where the opening portion 104 is opened to any direction such as a horizontal direction, or the like, in accordance with the direction of deployment of the air bag 33.

Further, as shown in FIGS. 1, 10, 11 and 12, fixation cavity portions 119 as a fixing portion are formed on left and right sides of the core panel 100 in this embodiment so that each of the fixation cavity portions 119 has an opening portion 120 opened upward for attaching and fixing the box 25. Each of the fixation cavity portions 119 is formed among an outer wall 121 disposed vertically, an inner wall 122 disposed inside from the outer wall 121 at a distance of the thickness B of the box 25, a front wall 123 and a rear wall 124 disposed back from the front wall 123 at a distance of the width W of the box 25. Support walls 125 and 126 for supporting flange portions 25b of the box 25 are formed in front and rear edges of the opening portion 120 respectively. Attachment holes 125a and 126a are formed in the support walls 125 and 126 respectively so that screws 143 are thread-engaged with the attachment holes 125a and 126a respectively. Further, an inspection hole 122a is opened in the inner wall 122.

Incidentally, the box 25 is constituted by a body 25a shaped like a rectangular parallelopiped and provided with wire harness 27 connected to its upper portion, and the flange portions 25b provided in the upper portion of the body 25a so as to extend outward in front and rear. The flange portions 25b are provided with insertion holes 25c through which screws 143 are inserted respectively.

Further, as shown in FIGS. 1, 2, 9 and 12, a circumferential wall portion 128 for forming air-conditioner ducts 145 capable of discharging air from the side defroster nozzles 29 and a circumferential wall portion 130 for forming air-conditioner ducts 147 capable of discharging air from the registers 9 are formed successively in the upper surface of the core panel 100 viewed from the front side.

Further, a two-forked circumferential wall portion 132 on the center rear side of the core panel 100 is provided for forming an air-conditioner duct 149 capable of discharging air from left and right sides of the cluster panel 21.

Further, the circumferential wall portions 128, 130 and 132 are formed to be substantially laterally symmetric with respect to the lateral center of the instrument panel P. Further, the circumferential wall portion 128 is constituted by side walls 128a and 128b opposite to each other and a bottom wall 128c. Similarly, the circumferential wall portion 130 is constituted by side walls 130a and 130b opposite to each other and a bottom wall 130c. Also the circumferential wall portion 132 is constituted by side walls 132a and 132b opposite to each other and a bottom wall 132c.

Further, the wire harness 27 connected to the boxes 25 is received on a bottom wall 134 between the side wall 128b of the circumferential wall portion 128 and the side wall 130a of the circumferential wall portion 130.

The attachment of the boxes 25 to the instrument panel P in this embodiment is as follows. First, the lower end side of each of the boxes 25 is inserted, through the opening portion 120 of the core panel 100, from above, in the corresponding fixation cavity portion 119 surrounded by the side walls 121, 122, 123 and 124, so that the flange portions 25b are made to abut on the support walls 125 and 126 respectively. Then, the screws 143 are thread-engaged with the attachment holes 125a and 126a through the insertion holes 25c respectively. The wire harness 27 is received on the bottom wall 134 between the side wall 128b of the circumferential wall portion 128 and the side wall 130a of the circumferential wall portion 130 in the condition that a connector not shown is disposed in a region of the predetermined meter 31, or the like.

Further, in the condition that the air bag 33, the registers 9, and so on, are installed, the upper panel 70 in which the side defroster nozzles 29 have been installed is disposed on the core panel 100. The screws 141 are thread-engaged with the attachment holes 71a through the insertion holes 101 respectively so that the core panel 100 and the upper panel 70 are connected to each other by use of the connection portions 71 and 101.

Then, the defroster nozzle 23 is disposed in a predetermined position of the body panel 1. The plurality of locking legs 117 (see FIG. 2) provided in the core panel 100 are locked in the locking holes 2 provided in the body panel 1, or the like, in the car. The attachment boss portion not shown but provided in the core panel 100 is screwed down to the body panel in another region. Further, the attachment bracket 115 of the casing portion 103 is fixed to the support bracket 47 by use of the stiffening plate 45, the bolt 49 and the nut 51. In this manner, as described above, the instrument panel P can be attached and fixed to the car.

Then, as described above, the grab box 5, the locking mechanism 7, the upper box 8, the cigarette lighter protector 15, the front console 17, the carpet covers 18, the undercover 19, the meter 31, the cluster panel 21, and so on, are installed in predetermined positions of the instrument panel P. Thus, the attachment of the instrument panel P to the car is completed. Incidentally, predetermined devices such as the meter 31, etc. are assembled by connecting the wire harness 27 extending from the boxes 25 to the predetermined devices.

Further, in the instrument panel P in this embodiment, the core panel 100 is provided with the fixation cavity portions 119 each having an opening portion 120 opened upward for attachment so that the boxes 25 are inserted in the fixation cavity portions 119 and attached and fixed into the fixation cavity portions 119 respectively.

Therefore, the boxes 25 are not attached to the body as in the background art but attached to the core panel 100 itself. With respect to the box attaching direction, the boxes 25 are inserted in the fixation cavity portions 119 through the opening portions 120 opened upward respectively. Then, the upper panel 70 is connected to the upper portion of the core panel 100 by use of the connection portions 71, 72, 101 and 102. Accordingly, the boxes 25 can be attached and fixed to the car easily because the work of attaching the boxes 25 can be performed under sufficient eye observation.

Hence, in the instrument panel P in this embodiment, the work of attaching the boxes 25 can be simplified.

Although the embodiment has shown the case where the boxes 25 are attached and fixed to the core panel 100 by use of the screws 143 for fastening the flange portions 25b to the support walls 125 and 126 respectively, the present invention may be applied also to the case where locking legs are formed in the circumferential side walls 121, 122, 123 and 124 of the fixation cavity portions 119 integrally with the core panel 100 so that the locking legs elastically deform, like springs, the upper edges of the boxes 25 to lock the boxes 25.

Further, in the instrument panel P in this embodiment, the air-conditioner ducts 145 capable of discharging air from the side defroster nozzles 29, the air-conditioner ducts 147 capable of discharging air from the registers 9 and the air-conditioner duct 149 capable of discharging air from the left and right sides of the cluster panel 21 are formed from the core panel 100 and the upper panel 70.

The air-conditioner ducts 145 are disposed so as to extend from the vicinity of the center portion to the left and right sides of the core panel 100 and further extend to the rear side at the left and right ends respectively. Further, the upper wall 145b in the circumferential walls 145a of the air-conditioner ducts 145 is formed from a cover portion 81 of the upper panel 70. The lower wall 145c other than the upper wall 145b in the circumferential wall portion 145a is formed from the circumferential wall portion 128 of the core panel 100 constituted by the side walls 128a and 128b and the bottom wall 128c.

Similarly, the air-conditioner ducts 147 are disposed so as to extend from the vicinity of the center portion to the left and right sides of the core panel 100 and further extend to the rear side at the left and right ends respectively. Further, the upper wall 147b in the circumferential walls 147a of the air-conditioner ducts 147 is formed from a cover portion 83 of the upper panel 70. The lower wall 147c other than the upper wall 147b in the circumferential wall portion 147a is formed from the circumferential wall portion 130 of the core panel 100 constituted by the side walls 130a and 130b and the bottom wall 130c.

Further, the air-conditioner duct 149 is disposed so as to extend from the vicinity of the center to the rear side of the core panel 100 and fork into two. Also the upper wall 149b in the circimferential walls 149a of the air-conditioner duct 149 is formed from a cover portion 85 of the upper panel 70. The lower wall 149c other than the upper wall 149b in the circumferential wall portion 149a is formed from the circumferential wall portion 132 of the core panel 100 constituted by the side walls 132a and 132b and the bottom wall 132c.

Figure 13:
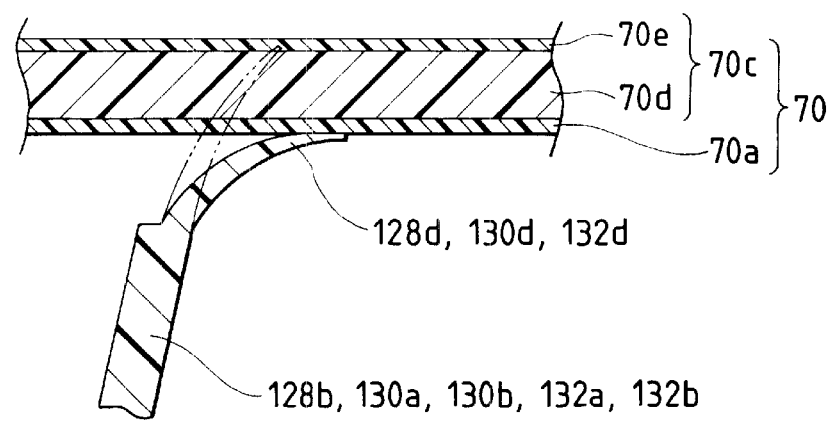
FIG. 13 is an enlarged sectional view of a lip portion in this embodiment.

Further, as shown in FIG. 13, lip portions 128d, 130d, 130e and 132d which are thin flexibly and tapered are formed at upper ends of the side walls 128b, 130a, 130b, 132a and 132b of the circumferential wall portions 128, 130 and 132 so as to be integrated with the core panel 100 in order to keep airtightness obtained by pressure contact of the lip portions 128d, 130d and 132d with the cover portions 81, 83 and 85 of the upper panel 70 when the upper panel 70 and the core panel 100 are connected to each other.

Figure 2:
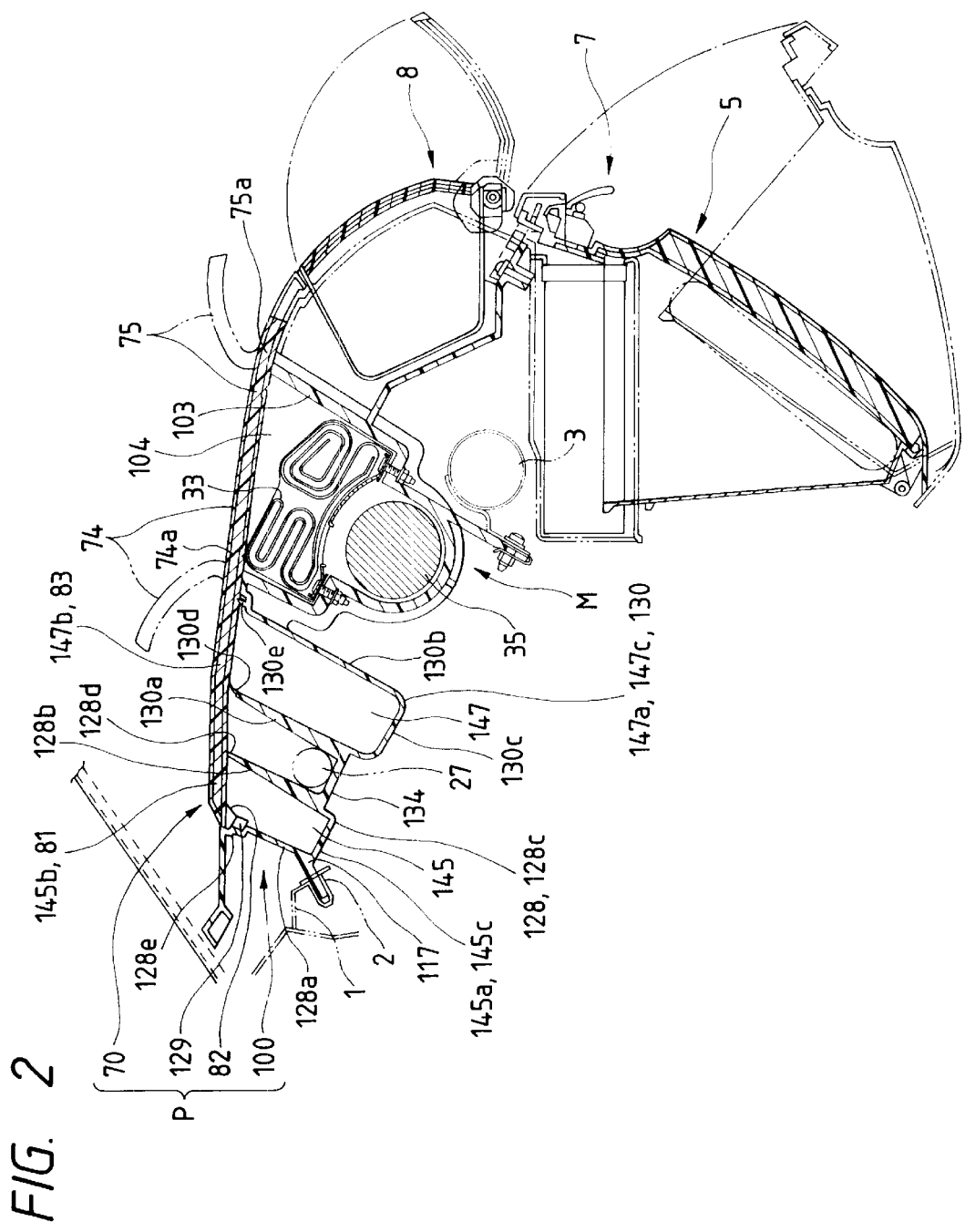
FIG. 2 is a vertical sectional view showing a state in which a passenger seat air bag unit is installed in the instrument panel in this embodiment.
Figure 3:
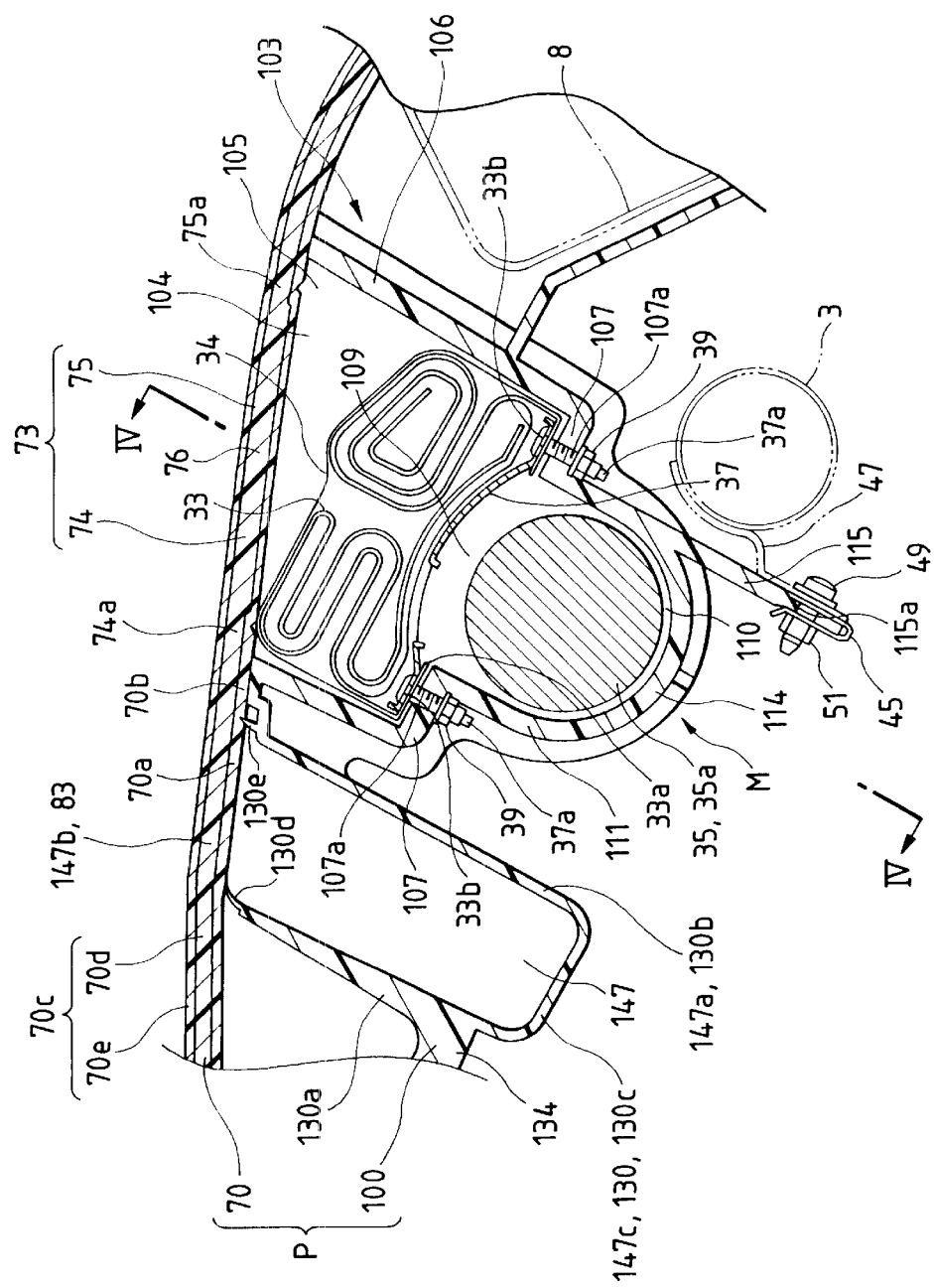
FIG. 3 is an enlarged vertical sectional view showing a state in which the passenger seat air bag unit is installed in the instrument panel in this embodiment.
Figure 9:
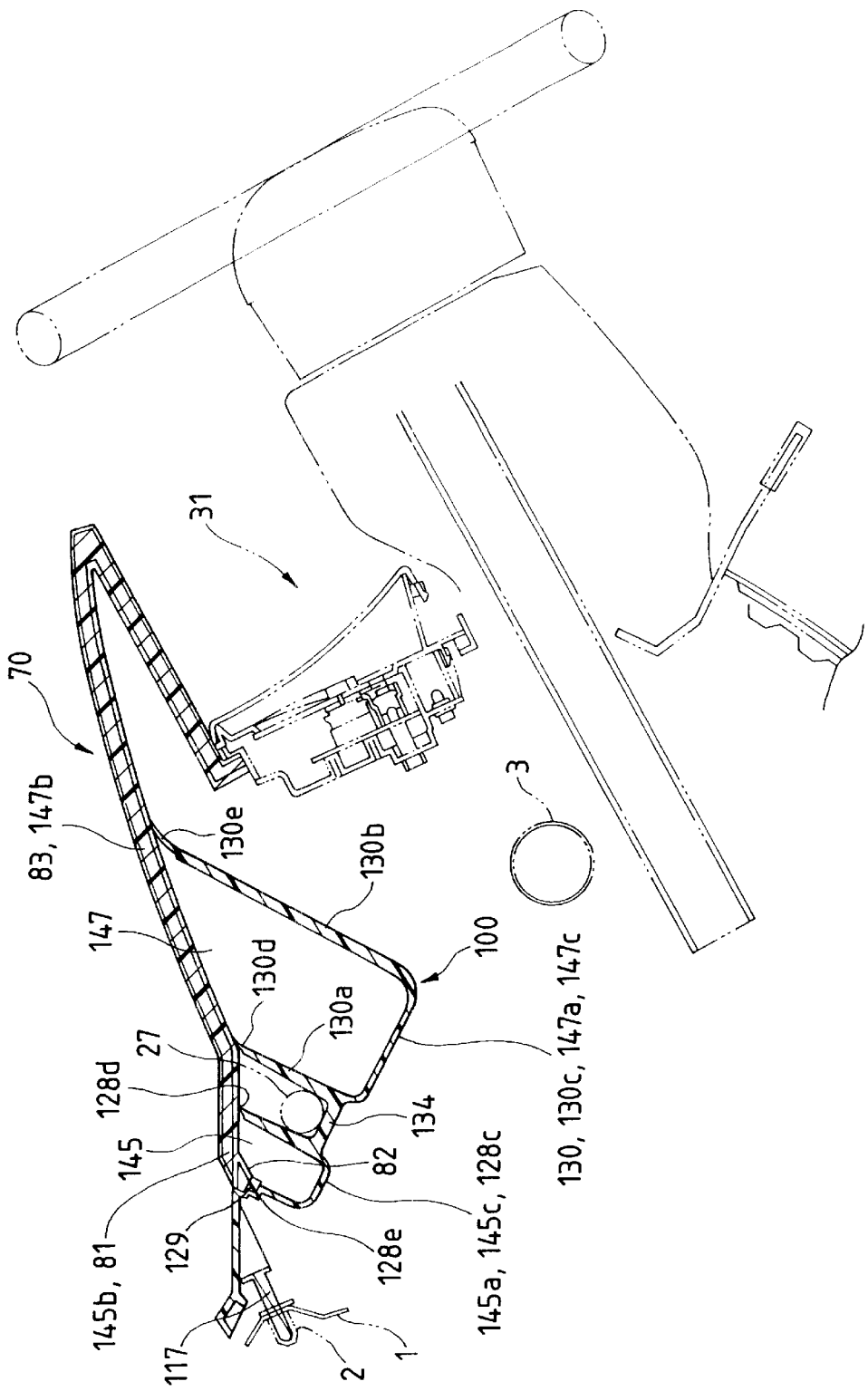
FIG. 9 is a vertical sectional view showing the vicinity of a region of arrangement of a steering wheel in the instrument panel in this embodiment.
Figure 10:
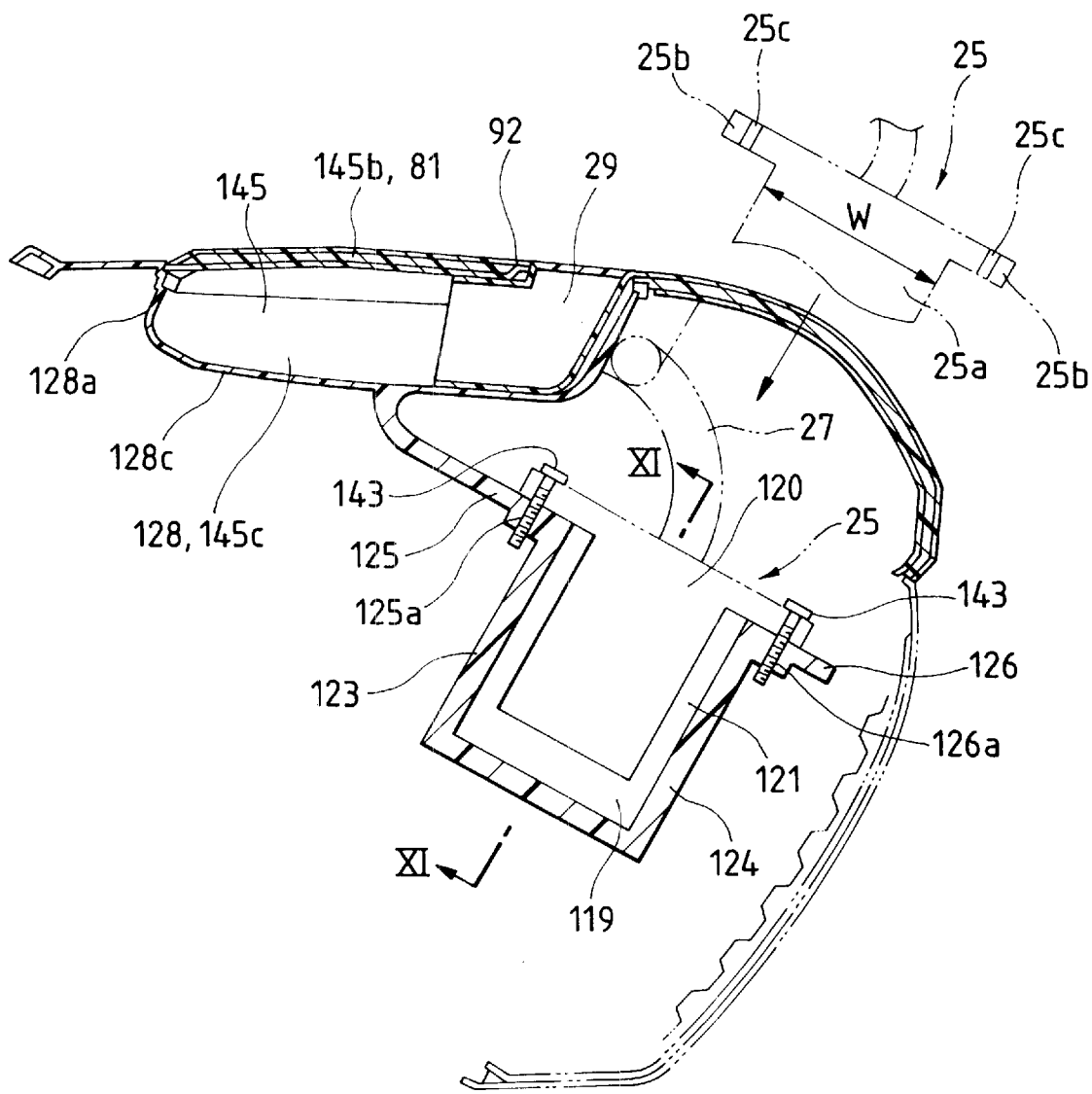
FIG. 10 is a vertical sectional view of a region of arrangement of a box (junction box) in the instrument panel in this embodiment.
Figure 11:
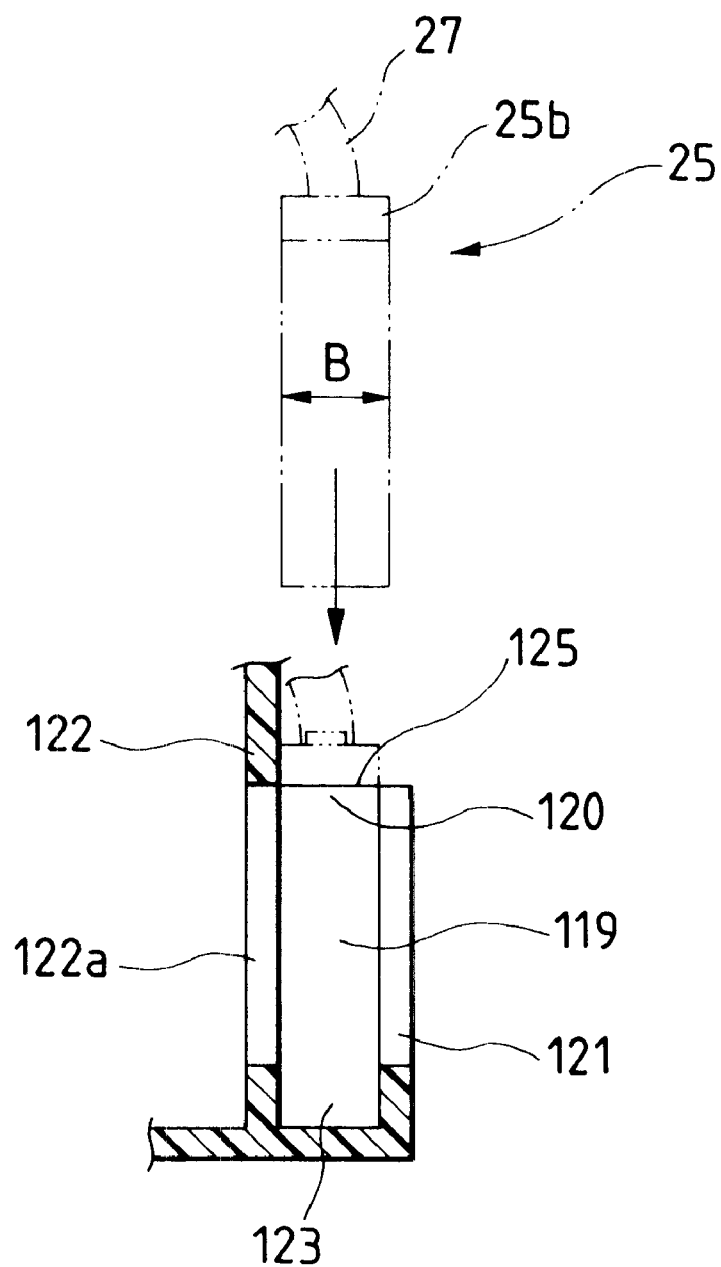
FIG. 11 is a vertical sectional view of a region of arrangement of the right-side box in the instrument panel in this embodiment, showing the XI—XI region in FIG. 10.

Incidentally, as shown in FIGS. 2, 9 and 12, there is formed no lip portion 128d in the front side wall 128a of the circumferential wall portion 128 because the side wall 128a must support the circumferential edge of the upper panel 70. There is provided a U-groove 128e in the upper end on the side wall 128b side of the front side wall 128a so that a linear sealing material 129 of elastic rubber or resin such as foamed rubber, foamed urethane, or the like, is stuck to the U-groove 128e. A thin fin portion 82 extending from the upper panel 70 comes into pressure contact with the sealing material 129 so that the airtightness of the air-conditioner ducts 145 is kept.

Further, as shown in FIGS. 2 to 4 and FIG. 12, there is formed no lip portion 130d in the rear side wall 130b in the circumferential wall portion 130 because the cover portion 73 of the upper panel 70 comes into contact with the vicinity of the region in which the air bag unit M is arranged.

Further, as shown in FIG. 12, communicating holes 144, 146 and 148 are formed in the bottom walls 128c, 130c and 132c of the circumferential wall portions 128, 130 and 132 respectively in the vicinity of the lateral center of the core panel 100 so that air discharge ports of an air conditioner not shown communicate with the air-conditioner ducts 145, 147 and 149. That is, two communicating holes 144, two communicating holes 146 and one communicating hole 148 are formed. Incidentally, the air discharge ports of the air conditioner not shown are disposed below the vicinity of the lateral center of the core panel 100. The air discharge ports are opened in regions communicating with the communicating holes 144, 146 and 148 and further opened in a region communicating with the defroster nozzle 23. Further, any air discharge port of the air conditioner not shown is not opened in the bottom wall 134 on which the wire harness 27 is disposed.

Further, the circumferential wall portion 130 constituting the air-conditioner ducts 147 of the core panel 100 in this embodiment is provided with receiving cavity portions 136 formed in region in which the registers 9 are disposed. The receiving cavity portions 136 have opening portions 137 opened upward for receiving the registers 9 respectively so as to be able to receive the registers 9 to be inserted therein.

Figure 6:
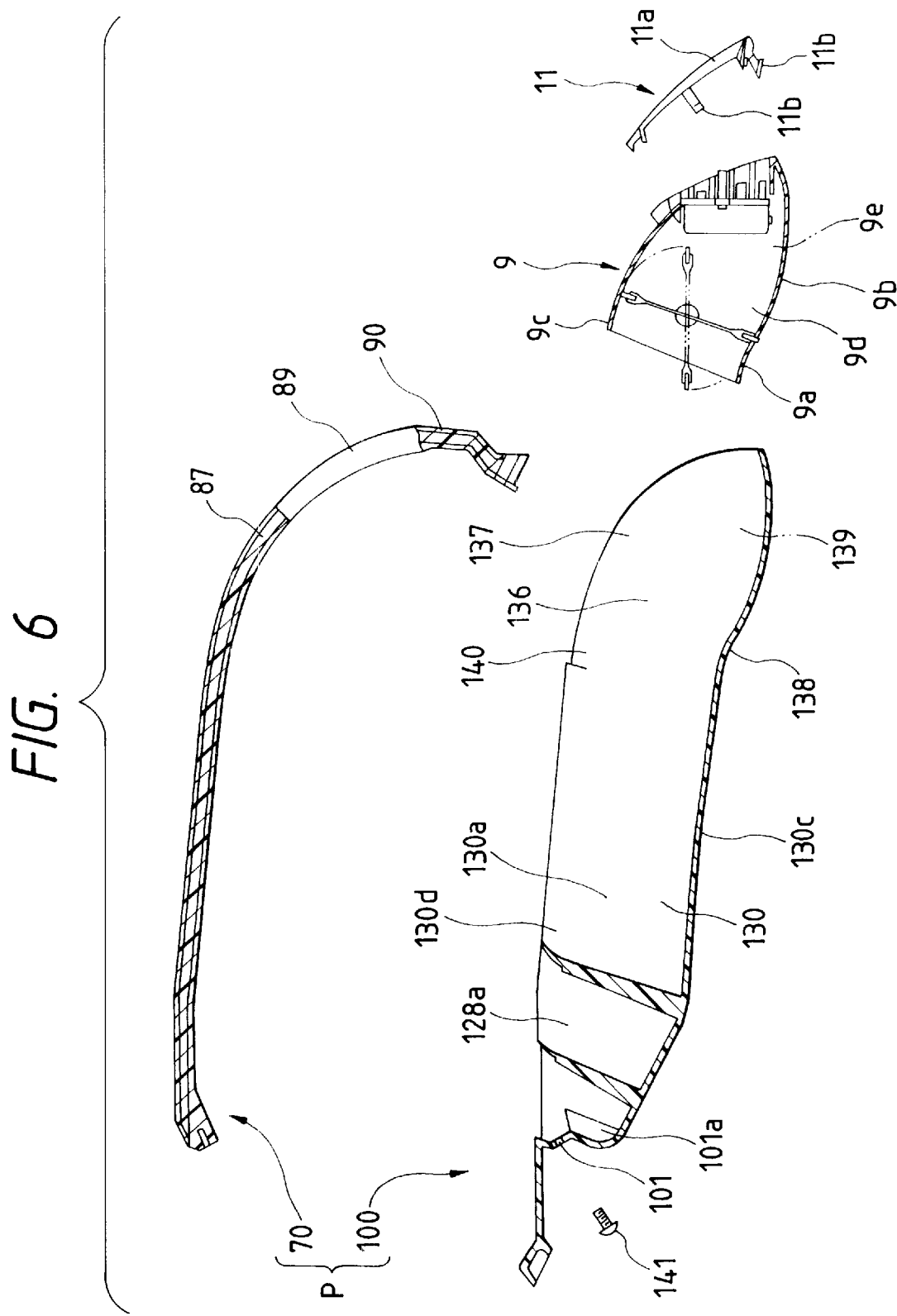
FIG. 6 is an exploded vertical sectional view of the region of arrangement of the register in this embodiment.

Incidentally, as shown in FIGS. 1, 5 and 6, each of the registers 9 is substantially shaped like a quadrilateral pipe having a bottom wall 9a, a ceiling wall 9c disposed above the bottom wall 9a, and side walls 9d and 9e for connecting vertically the left and right edges of the bottom wall 9a and the ceiling wall 9c. A fin body 9f in which a plurality of fins capable of adjusting the wind direction are disposed, and a damper 9g are disposed in the inside of the register 9. The bottom wall 9a has a swollen portion 9b in which the center region of the bottom wall 9a in the front-rear direction is swollen downward. The ceiling wall 9c is formed so that its rear end side is inclined downward.

Further, the receiving cavity portions 136 are disposed on the rear end side on the left and right sides of the circumferential wall portions 130. Each of the receiving cavity portions 136 has a bottom wall 138 curved correspondingly to the whole lower surface of the bottom wall 9a of the register 9, and side walls 139 and 140 capable of supporting the outer surfaces of the side walls 9d and 9e of the register 9 respectively. The bottom wall 138 is formed by extension of the bottom wall 130c of the circumferential wall portion 130. The side walls 139 and 140 are formed by extension of the side walls 130a and 130b, respectively, of the circumferential wall portion 130.

On the other hand, holding portions 87 which can hold the registers 9 so as to cooperate with the core panel 100 when the upper panel 70 and the core panel 100 are connected to each other are formed in regions of the upper panel 70 in which the registers 9 are disposed. Each of the holding portions 87 is formed so as to extend from the cover portion 85 constituting the upper wall 147b of the air-conditioner duct 147. Each of the holding portions 87 abuts on the upper surface of the ceiling wall 9c of the register 9 put in the receiving cavity portion 136 and extends to the lower portion of the rear side of the register 9. Further, each of the holding portions 87 is provided with a vent 89 which is opened rectangularly so that the rear side of the register 9 is exposed. A register bezel 11 shaped like a quadrilateral ring is attached to the circumferential edge of each vent 89 so that the external appearance of the outer circumferential edge on the rear side of the register 9 is made good. The register bezel 11 has a body 11a shaped like a quadrilateral ring, and a plurality of locking legs 11b extending forward from the back side of the body 11a. Each of the locking legs 11b has a hook-like protrusion portion in its tip. The locking legs 11b are bent and the protrusion portions of the locking legs 11b are locked to a circumferential edge 90 of the vent 89 so that the register bezel 11 is attached to the holding portion 87.

The attachment of the registers 9 to the instrument panel P is as follows. First, as shown in FIGS. 6 and 7, the registers 9 are put in the receiving cavity portions 136 of the core panel 100 through the opening portions 137 respectively.

Figure 8:
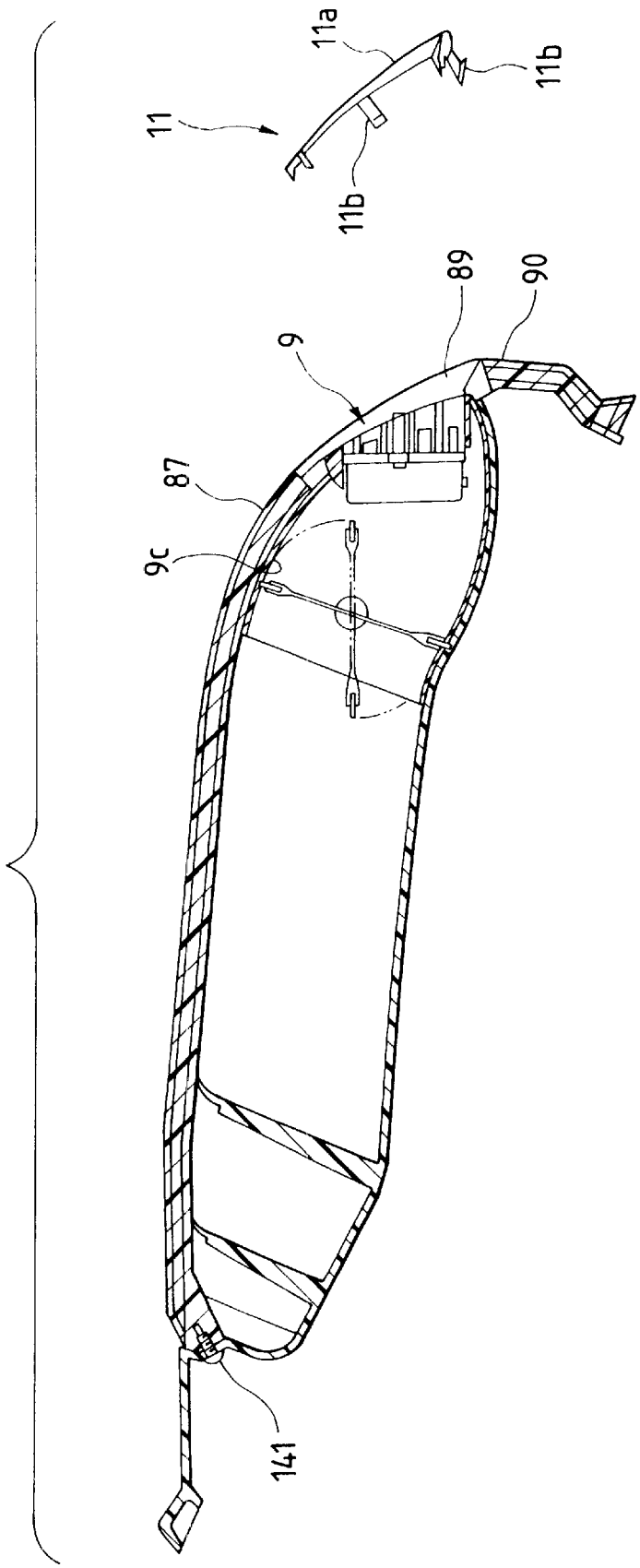
FIG. 8 is a vertical sectional view for explaining a state of installation of the register in this embodiment and showing a step following FIG. 7.

Then, as shown in FIG. 8, in the condition that the air bag 33, the boxes 25, and so on, are installed, the upper panel 70 in which the side defroster nozzles 29 have been installed is disposed on the core panel 100. The screws 141 are thread-engaged with the attachment holes 71a through the insertion holes 101 respectively, so that the core panel 100 and the upper panel 70 are connected to each other by use of the connection portions 71 and 101.

On this occasion, each of the registers 9 is prevented from moving up because the holding portion 87 restricts the ceiling wall 9c. Further, the movement of the register 9 in the front-rear direction is limited because the bottom wall 9a having the swollen portion 9b is fitted to the bottom wall 138 of the receiving cavity portion 136. The movement of the register 9 in the left-right direction is limited because the side walls 9d and 9e are limited by the side walls 139 and 140, respectively, of the receiving cavity portion 136. In this manner, each of the registers 9 is attached and fixed to the instrument panel P.

If the register bezels 11 are then fitted to the circumferential edges 90 of the vents of the holding portions 87 respectively, the work of attaching the registers 9 to the instrument panel P is completed.

Then, as described above, the instrument panel P is attached and fixed to the car and a grab box 5, and so on, may be installed in the instrument panel P.

As described above, in the instrument panel P in this embodiment, the core panel 100 has the receiving cavity portions 136 provided in regions of arrangement of the registers 9 and having the opening portions 137 opened upward for receiving the registers 9 to be fitted therein respectively whereas the upper panel 70 has the holding portions 87 provided in regions of arrangement of the registers 9, which can hold the registers 9 so as to cooperate with the core panel 100 when the upper panel 70 and the core panel 100 are connected to each other.

Therefore, the attachment of the registers 9 to the instrument panel P is as follows. The registers 9 are fitted into the receiving cavity portions 136 through the opening portions 137 respectively in the core panel 100. Then, the upper panel 70 is connected to the core panel 100 by use of the connection portions 71 and 101. Thus, the registers 9 are held in the receiving cavity portions 136 by the holding portions 87 respectively in the upper panel 70.

Therefore, in the instrument panel P in this embodiment, the registers 9 are received in the receiving cavity portions 136 respectively in the core panel 100 simply without use of any screw means. The registers 9 can be attached to the instrument panel P easily by a simple means of assembling the instrument panel P itself after that. Hence, the work of attaching the registers 9 is simplified.

It is a matter of course that air for air-conditioning can be fed to the registers 9 smoothly because the air-conditioner ducts 147 constituted by the cover portion 83 of the upper panel 70 and the circumferential wall portion 130 of the core panel 100 communicate with the registers 9 respectively after the upper panel 70 and the core panel 100 are connected to each other.

Hence, in the instrument panel P in this embodiment, the registers 9 can be attached to the instrument panel P easily by a simple means of disposing the registers 9 in predetermined positions respectively in the middle of assembling of the instrument panel P in which the upper panel 70 and the core panel 100 are connected to each other.

Although the embodiment has shown the case where the register bezels 11 are attached to the circumferential edges of the registers 9 respectively, the present invention may be applied also to the case where such register bezels 11 are not used if the registers 9 are well parted from the vents 89 of the holding portions.

Further, in this embodiment, for limitation in the movement of the registers 9 in the front-rear direction, the bottom wall 9a of each of the registers 9 is provided with the swollen portion 9b and the bottom wall 138 of a corresponding receiving cavity portion 136 of the core panel 100 is formed in accordance with the shape of the bottom wall 9a. The registers 9 can be, however, installed well if the registers 9 are held between the core panel 100 and the upper panel 70 so as not to move back and forth, left and right, and up and down when the upper panel 70 is connected to the core panel 100. Besides the case where roughness is provided in the bottom wall 9a of each of the registers 9, roughness may be provided in the ceiling wall 9c or the side walls 9d and 9e or inclination may be provided in the bottom wall 9a, the ceiling wall 9c or the side walls 9d and 9e so that the registers 9 are held between the core panel 100 and the upper panel 70 so as to be prevented from moving back and forth, left and right, and up and down if the receiving cavity portions 136 and the holding portions 87 are provided to correspond to the registers 9.

Further, in the instrument panel P in this embodiment, the upper panel 70 has the cover portions 81, 83 and 85 constituting the upper walls 145b, 147b and 149b in the circumferential walls 145a, 147a and 149a of the air-conditioner ducts 145, 147 and 149 respectively whereas the core panel 100 has the circumferential wall portions 128, 130 and 132 constituting the lower walls 145c, 147c and 149c other than the upper walls 145b, 147b and 149b in the circumferential walls 145a, 147a and 149a of the air-conditioner ducts 145, 147 and 149 respectively. Further, the flexible thin lip portions 128d, 130d and 132d are formed at upper ends of the side walls 128b, 130a, 130b, 132a and 132b of the circumferential wall portions 128, 130 and 132 so as to be integrated with the core panel 100 in order to keep airtightness obtained by the pressure contact of the lip portions 128d, 130d and 132d with the cover portions 81, 83 and 85 of the upper panel 70 when the upper panel 70 and the core panel 100 are connected to each other.

Therefore, when the upper panel 70 and the core panel 100 are connected to each other, the lip portions 128d, 130d and 132d formed in the circumferential wall portions 128, 130 and 132 of the core panel 100 come into pressure contact with the cover portions 81, 83 and 85 of the upper panel 70 so that the air-conditioner ducts 145, 147 and 149 can be kept airtight. Further, since the lip portions 128d, 130d and 132d are formed integrally with the circumferential wall portions 128, 130 and 132 of the core panel 100, the lip portions 128d, 130d and 132d need not be provided as special members to be separately attached to the circumferential wall portions 128, 130 and 132.

Hence, in the instrument panel P in this embodiment, regions in which the air-conditioner ducts 145, 147 and 149 are formed can be kept airtight easily while increase in the number of constituent parts is suppressed.

Although the embodiment has shown the case where the lip portions 128d, 130d and 132d are provided on the circumferential wall portions 128, 130 and 132 side of the core panel 100, the present invention may be applied also to the case where such lip portions are provided on the cover portions 81, 83 and 85 of the upper panel 70 integrally with the upper panel 70 so as to come into pressure contact with the upper end surfaces of the side walls 128b, 130a, 130b, 132a and 132b in the circumferential wall portions 128, 130 and 132 of the core panel 100 without provision of the lip portions 128d, 130d and 132d on the core panel 100 side.

Further, the air-conditioner ducts may be formed by use of wall portions protruding from both the core panel 100 and the upper panel 70 so that a lip portion provided in the end surface of one wall portion comes into pressure contact with the end surface of the other wall portion. However, if such lip portions are formed to come into pressure contact with flat regions which are not end surfaces such as the cover portions 81, 83 and 85, or the like, as described above in the embodiment, airtightness can be secured easily and preferably regardless of error in assembling.

Figure 14:
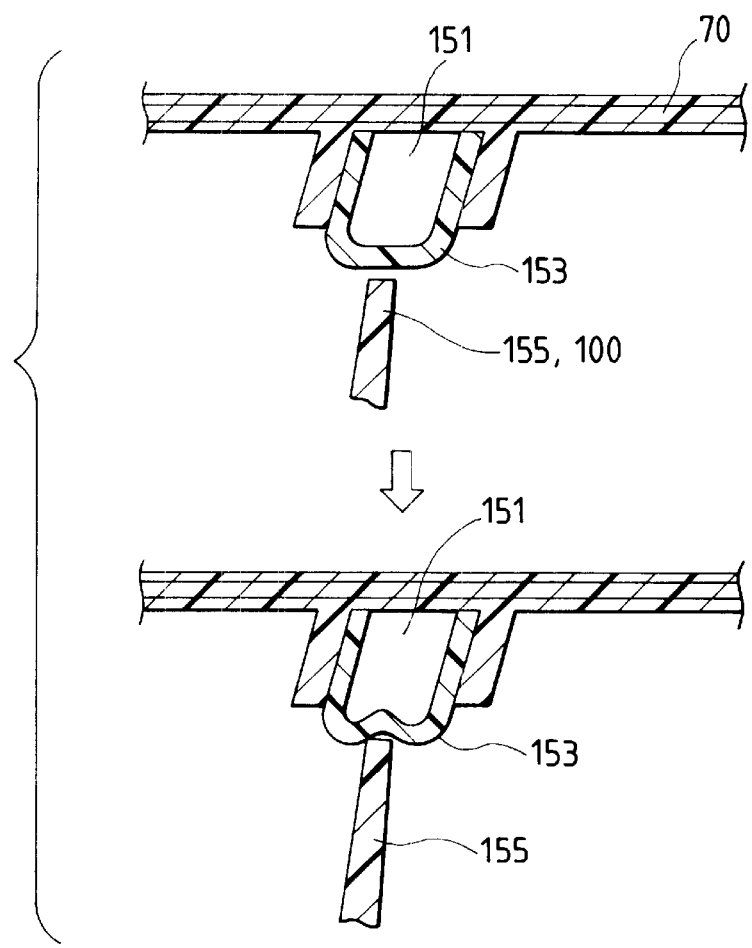
FIG. 14 is an enlarged sectional view showing a sealing structure in another embodiment.

Without consideration of the aforementioned respect, as shown in FIG. 14, a semicylindrical sealing material 153 of elastically deformable soft synthetic resin, rubber, or the like, may be assembled with an assembly cavity portion 151 provided in the upper panel 70 or the core panel 100 so that a wall portion 155 provided in the core panel 100 or the upper panel 70 comes into pressure contact with the sealing material 153 when the upper panel 70 and the core panel 100 are connected to each other.

Figure 15:
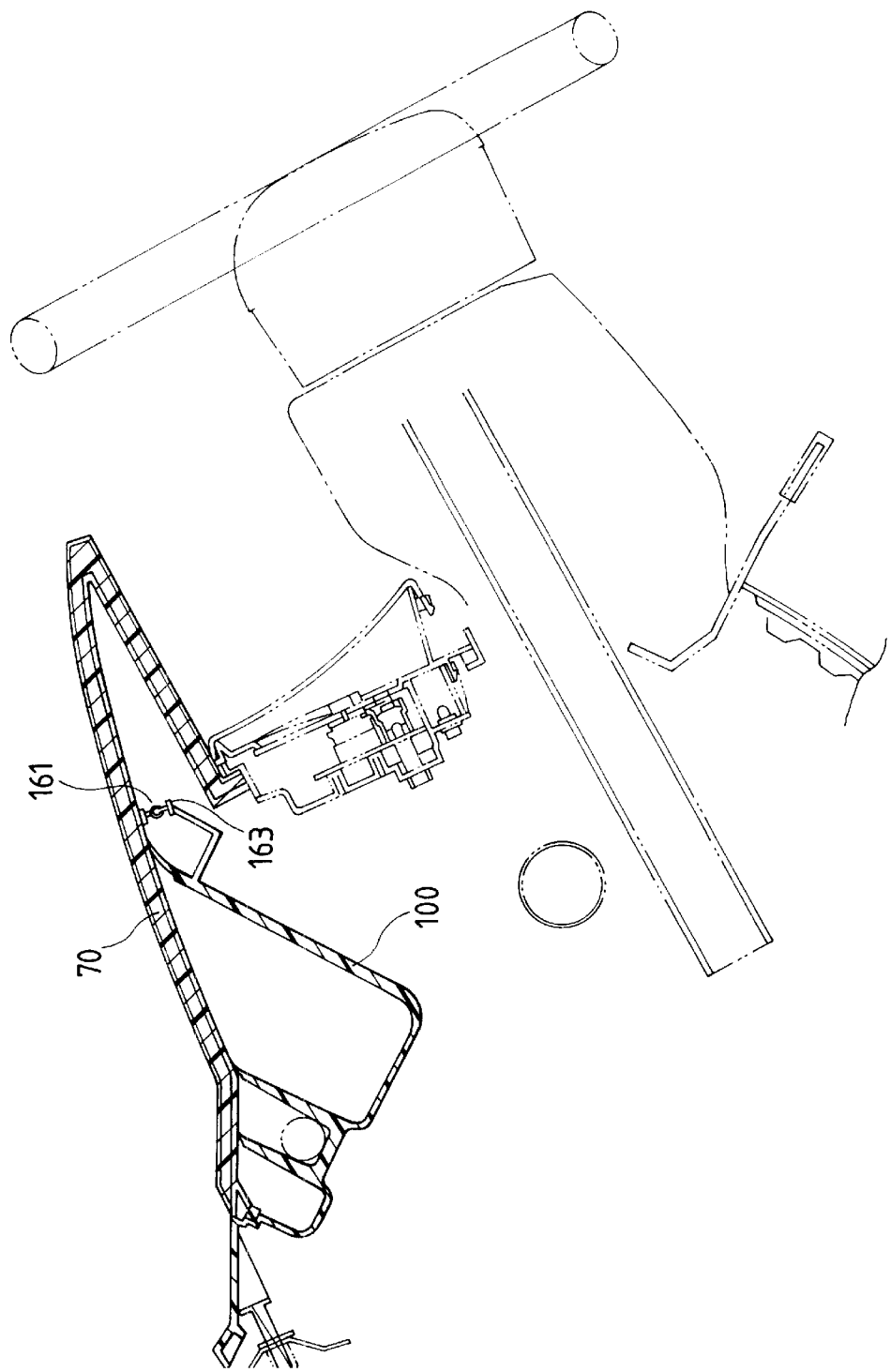
FIG. 15 is a vertical sectional view showing a structure for connecting the upper panel and the core panel to each other in a further embodiment.
Figure 16:
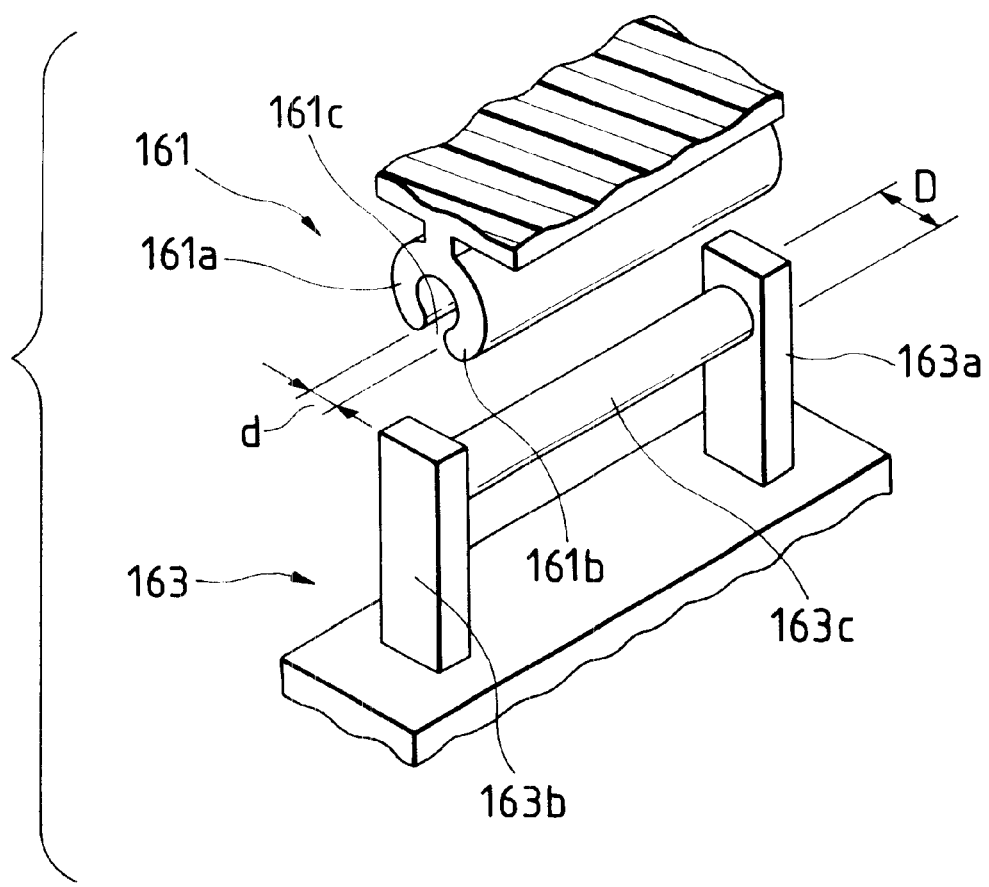
FIG. 16 is an enlarged perspective view of connection portions in the further embodiment.

Although the embodiment has shown the case where the screws 141 are used for connecting the upper panel 70 and the core panel 100 to each other, the present invention may be applied also to the case where connection portions 161 and 163 fitted to each other as shown in FIGS. 15 and 16 are used in addition to the screws 141. The connection portion 161 is formed integrally with the upper panel 70. The connection portion 161 has semicylindrical side wall portions 161*a* and 161*b* provided with an opening portion 161*c* which can be opened elastically by its spring function. The connection portion 163 is formed integrally with the core panel 100. The connection portion 163 has a stopper bar 163*c* having a larger outer diameter D than the opening width d of the opening portion 161*c* and capable of being received between the side wall portions 161*a* and 161*b*, and support portions 163*a* and 163*b* for supporting the stopper bar 163*c*. The side wall portions 161*a* and 161*b* are bent so that the stopper bar 163*c* is made to pass through the opening portion 161*c*. In this manner, the stopper bar 163*c* is received into between the side wall portions 161*a* and 161*b* so that the connection portions 161 and 163 are connected to each other. Incidentally, the connection portions 161 and 163 may be provided in the core panel 100 and the upper panel 70 respectively at option reversely.

Although the invention has been described in its preferred form with a certain degree of particularity, it is understood that the present disclosure of the preferred form can be d arrangement of parts without departing from the spirit and the scope of the invention as hereinafter claimed.

What is claimed is:

1. An instrument panel comprising:
   an upper panel of a synthetic resin; and
   a rigid core panel of a synthetic resin connected to a rear side of said upper panel, wherein
   said core panel comprises a casing portion integrally formed in one piece therewith, said casing portion being open in an airbag-deploying direction and being adapted to receive a folded airbag and an inflator for supplying an inflating gas to said airbag, and
   said upper panel comprises a door portion which covers said casing portion so that said door portion is pressed and opened by said airbag when said airbag is inflated.

2. An instrument panel according to claim 1, wherein said upper panel comprises a decorative sheet formed on a surface thereof.

3. An instrument panel according to claim 1, wherein said core panel comprises filler-containing polypropylene.

4. An instrument panel comprising:
   an upper panel of a synthetic resin disposed on a front side; and
   a core panel of a synthetic resin disposed on a rear side of said upper panel and having a shape retentive property, said upper panel and said core panel being provided with connection portions which can be connected to each other,
   wherein said core panel has formed therein an upwardly open fixation cavity configured to receive therein an electrical junction box.

5. An instrument panel according to claim 4, wherein said upper panel comprises a decorative sheet formed on a surface thereof.

6. An instrument panel according to claim 4, wherein said core panel comprises filler-containing polypropylene.

7. An instrument panel comprising:
   an upper panel of a synthetic resin disposed on a front side and having a cover portion which comprises a first partial air-conditioner duct;
   a vent register; and
   a core panel of a synthetic resin disposed on a rear side of said upper panel and having a shape retentive property, said core panel comprising:
   a second partial air-conditioner duct, which cooperates with said first partial air conditioner duct to form an air conditioner duct,
   wherein said core panel defines a bottom wall of said air-conditioner duct and said upper panel provides a holding portion, said vent register being disposed between and retained by said bottom wall and said holding portion to be communicated with said air-conditioner duct when said upper panel and said core panel are connected to each other.

8. An instrument panel according to claim 7, wherein said upper panel comprises a decorative sheet formed on a surface thereof.

9. An instrument panel according to claim 7, wherein said core panel comprises filler-containing polypropylene.

10. An instrument panel comprising:
    an upper panel of a synthetic resin disposed on a front side, said upper panel comprising a cover portion which constitutes an upper wall of a circumferential wall of an air-conditioner duct; and
    a core panel of a synthetic resin disposed on a rear side of said upper panel and having a shape retentive property, said core panel including a circumferential wall portion which constitutes walls other than said upper wall of said circumferential wall of said duct;
    wherein said upper panel and said core panel are provided with connection portions which can be connected to each other, and a flexible portion is formed at one of an upper end of said circumferential wall portion and a lower end of said cover portion integrally with one of said core panel and said upper panel so that said lip portions come into pressure contact with one of said cover portion of said upper panel and said circumferential wall portion of said core panel to keep airtightness when said upper panel and said core panel are connected to each other.

11. An instrument panel according to claim 10, wherein said upper panel comprises a decorative sheet formed on a surface thereof.

12. An instrument panel according to claim 10, wherein said core panel comprises filler-containing polypropylene.

13. An instrument panel according to claim 10, wherein said flexible portion comprises a flexible thin lip portion.

14. An instrument panel according to claim 1, in combination with a folded air bag of an air bag device for a passenger seat and an inflator for supplying an inflating gas to said air bag.

15. An instrument panel according to claim 4, wherein said core panel comprises a casing portion having an opening portion opened in an air bag-deploying direction, said casing portion receiving a folded air bag of an air bag device for a passenger seat and an inflator for supplying an inflating gas to said air bag, and
    wherein said upper panel comprises a door portion which covers said casing portion so that said door portion is pressed and opened by said air bag when said air bag is inflated.

16. An instrument panel according to claim 7, wherein said core panel comprises a casing portion having an opening portion opened in an air bag-deploying direction, said casing portion receiving a folded air bag of an air bag device for a passenger seat and an inflator for supplying an inflating gas to said air bag, and wherein said upper panel comprises a door portion which covers said casing portion so that said door portion is pressed and opened by said air bag when said air bag is inflated.

17. An instrument panel according to claim 10, wherein said core panel comprises a casing portion having an opening portion opened in an air bag-deploying direction, said casing portion receiving a folded air bag of an air bag device for a passenger seat and an inflator for supplying an inflating gas to said air bag, and wherein said upper panel comprises a door portion which covers said casing portion so that said door portion is pressed and opened by said air bag when said air bag is inflated.

18. An instrument panel according to claim 1, wherein said door portion is formed integrally with said upper panel.

19. An instrument panel according to claim 4, wherein said core panel includes a pair of said fixation cavities disposed on respective sides of said core panel for receiving a corresponding pair of electrical junction boxes.

20. An instrument panel according to claim 19, wherein said core panel includes a support wall within which a plurality of generally vertically extending attachment recesses are formed, said attachment recesses being disposed adjacent said fixation cavities and being configured to accept fasteners extending from said electrical junction boxes for securing said electrical junction boxes to said core panel.

21. An instrument panel according to claim 4, wherein said core panel includes a plurality of fastener-receiving openings formed therein, said upper panel including a corresponding plurality of fastening recesses configured to accept fasteners disposed through respective fastener-receiving openings to thereby secure said core and upper panels to one another.

22. An instrument panel according to claim 21, wherein said core panel includes one of said fastener receiving openings adjacent each side of said core panel and another of said fastener-receiving openings generally at a middle portion of said core panel.

23. An instrument panel according to claim 7, wherein said core panel includes a plurality of fastener-receiving openings formed therein, said upper panel including a corresponding plurality of fastening recesses configured to accept fasteners disposed through respective fastener receiving openings to thereby secure said core and upper panels to one another.

24. An instrument panel according to claim 23, wherein said core panel includes one of said fastener receiving openings adjacent each side of said core panel and another of said fastener receiving openings generally at a middle portion of said core panel.

* * * * *